US007254718B2

(12) United States Patent
Kaminaga et al.

(10) Patent No.: US 7,254,718 B2
(45) Date of Patent: Aug. 7, 2007

(54) TAMPER-RESISTANT PROCESSING METHOD

(75) Inventors: Masahiro Kaminaga, Sakado (JP); Takashi Endo, Musashimurayama (JP); Takashi Watanabe, Kokubunji (JP); Masaru Ohki, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 818 days.

(21) Appl. No.: 09/940,985

(22) Filed: Aug. 29, 2001

(65) Prior Publication Data
US 2002/0166057 A1 Nov. 7, 2002

(30) Foreign Application Priority Data
Mar. 6, 2001 (JP) .............................. 2001-061544

(51) Int. Cl.
G06F 12/14 (2006.01)
H04L 9/30 (2006.01)
(52) U.S. Cl. ..................................................... 713/194
(58) Field of Classification Search ................ 713/194, 713/189, 190; 708/490; 726/34; 712/245
See application file for complete search history.

(56) References Cited

U.S. PATENT DOCUMENTS

| 6,278,783 | B1* | 8/2001 | Kocher et al. ............... 380/277 |
| 6,308,256 | B1* | 10/2001 | Folmsbee .................... 712/209 |
| 6,327,661 | B1* | 12/2001 | Kocher et al. ............... 713/193 |
| 6,438,664 | B1* | 8/2002 | McGrath et al. ............ 711/154 |
| 6,725,374 | B1* | 4/2004 | Jahnich et al. .............. 713/190 |
| 6,748,410 | B1* | 6/2004 | Gressel et al. .............. 708/491 |
| 6,748,535 | B1* | 6/2004 | Ryan et al. .................. 713/189 |
| 2001/0012360 | A1* | 8/2001 | Akkar et al. ................... 380/29 |

FOREIGN PATENT DOCUMENTS

DE 19845073 A1 * 4/2000

(Continued)

OTHER PUBLICATIONS

Meeserges, Thomas et al. "Investigations of Power Analysis Attacks on Smartcards." USENIX Workshop on Smarcard Technology. The USENIX Association, 1999.*

(Continued)

Primary Examiner—Emmanuel L. Moise
Assistant Examiner—Zachary A. Davis
(74) Attorney, Agent, or Firm—Mattingly, Stanger, Malur & Brundidge, P.C.

(57) ABSTRACT

The subject of the disclosed technology is, when a crypto-processing is performed utilizing an information processing device buried in an IC card, etc., to decrease the relationship between the waveform of the consumption current and the contents of the crypto-processing as a countermeasure against a tamper which observes the waveform of a consumption current.

A solution means is shown in the following. When a decryption processing of an RSA cryptogram is performed according to CRT, in step 608, for every unit bit block of XP a modular exponentiation calculation is performed, and the partial result of CP up to the calculated bit block is stored in a memory. In step 609, for every unit bit block of XQ a modular exponentiation calculation is performed and the partial result of CQ up to the calculated bit block is stored in a memory. In step 606, a random number is generated, and in step 607, it is decided that step 608 is to be executed or step 609 is to be executed corresponding to the value of the random number.

6 Claims, 25 Drawing Sheets

FOREIGN PATENT DOCUMENTS

| | | | | |
|---|---|---|---|---|
| EP | 0946018 | | | 9/1999 |
| GB | 2345229 | A | * | 6/2000 |
| WO | WO 99/63696 | | | 12/1999 |
| WO | WO 00/42511 | | | 7/2000 |

OTHER PUBLICATIONS

"A Timing Attack against RSA with the Chinese Remainder Theorem", Werner Schindler, CHES 2000, LNCS 1965, pp. 109-124.

Eiji Okamoto, An Introduction to the Theory of Cryptography, published by Kyoritsu Shuppan Co., Ltd., Japan, Feb. 25, 1993.

Smart Card Handbook, p. 263, W. Rankl and Effing. John Wiley & Sons, 1997.

Tamper Resistance—a Cautionary Note, pp. 1-11 1996.

Chinese Remaindering Based Cryptosystems in the Presence of Faults, pp. 1-5. 1999.

Modular Multiplication Without Trial Division:, P. Montgomery, pp. 519-521. 1985.

* cited by examiner

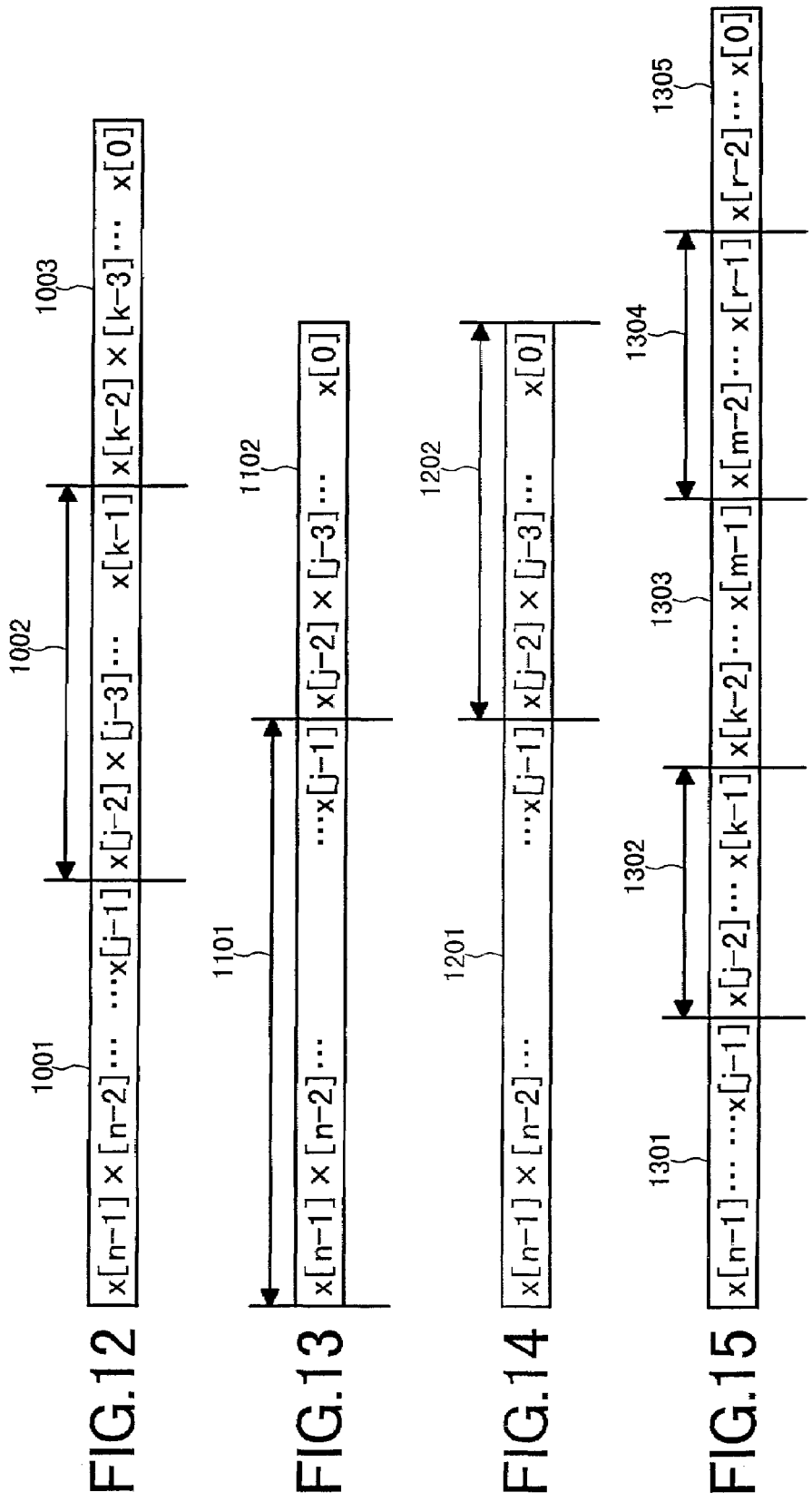

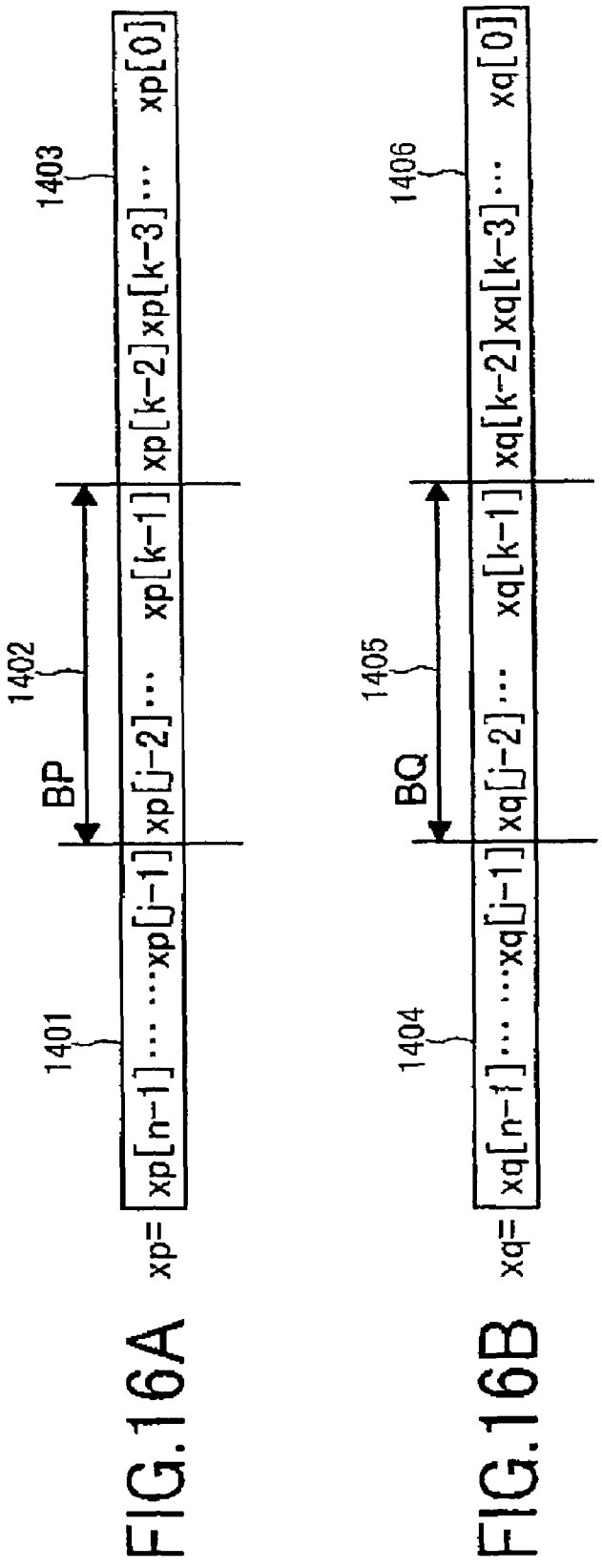

FIG.23

|   |   | A[1] | A[0] |
|---|---|------|------|
| × |   | B[1] | B[0] |

|   |   |   | T[0][1] | T[0][0] |
|---|---|---|---------|---------|
|   |   | T[1][1] | T[1][0] |   |
|   |   | T[2][1] | T[2][0] |   |
| + | T[3][1] | T[3][0] |   |   |

| C[3] | C[2] | C[1] | C[0] |

FIG.28

Prior Art

| A | B | A EXOR B |
|---|---|----------|
| 1 | 1 | 0 |
| 1 | 0 | 1 |
| 0 | 1 | 1 |
| 0 | 0 | 0 |

FIG.29

Prior Art

| A | B | A AND B |
|---|---|---------|
| 1 | 1 | 1 |
| 1 | 0 | 0 |
| 0 | 1 | 0 |
| 0 | 0 | 0 |

FIG.30
Prior Art

| A | B | A OR B |
|---|---|--------|
| 1 | 1 | 1 |
| 1 | 0 | 1 |
| 0 | 1 | 1 |
| 0 | 0 | 0 |

TAMPER-RESISTANT PROCESSING METHOD

2. BACKGROUND OF THE INVENTION

The present invention relates to a tamper-resistant crypto-processing method for high security media such as IC cards.

An IC card is a device which keeps tamper-prohibited personal formation or performs encryption of data or decryption of a ciphertext with the use of secret keys. An IC card itself does not have its own power supply, and when it is inserted into a reader/writer for an IC card, power is supplied to the IC card and it is made operable. After it is made operable, the IC card receives commands transmitted from the reader/writer, and following the commands the IC card processes, for example, transfer of data. A general explanation of an IC card is given in Junichi Mizusawa, "IC card", Ohm Corporation, compiled by the Society of Electronic Communication and Information, etc.

An IC card is constituted such that a chip 102 for an IC card is mounted on a card 101 as shown in FIG. 1. In general, an IC card comprises a power supply terminal VCC, a grounding terminal GND, a reset terminal RST, an input/output terminal I/O, and a clock pulse terminal CLK at the positions determined by the ISO7816 standards, and through these terminals an IC card is supplied power from a reader/writer or communicates with it (Refer to W. Rank1 and Effing: Smartcard Handbook, John Wiley & AMP; SONS, 1997, PP. 41).

The configuration of a chip for an IC card is basically the same as that of a typical microcomputer. The configuration is, as shown in FIG. 2, composed of a central processing unit (CPU) 201, a memory device 204, an input/output (I/O) port 207, and a coprocessor 202 (in some case, there is no coprocessor). The CPU 201 is a device which performs logical operation, arithmetical operation, etc. The memory device 204 is a device which stores programs 205, data, etc. The input/output port 207 is a device which communicates with the reader/writer. The coprocessor 202 is a device which performs crypto-processing itself or performs operation necessary for crypto-processing with a high speed. There is, for example, a special calculator for performing residue operation of RSA cryptogram or a cipher device which performs round processing of DES cryptogram. Some of the processors for IC cards comprise no coprocessor. A data bus 203 is a bus which connect respective devices to each other.

The memory device 204 is composed of ROM (read only memory), RAM (random access memory), EEPROM (electrical erasable programmable read only memory), etc. ROM is a memory which is not changeable and it is mainly used for storing programs. RAM is a memory which can be freely rewritable but when the power supply thereof is off, the stored contents of the RAM are erased. When an IC card is drawn out of a reader/writer, since the power supply is made off, the contents of the RAM disappear. EEPROM is a memory which holds the contents even when the power supply is stopped. EEPROM is used to store the data which are to be held thereon even when it is disconnected from the reader/writer in a case where rewriting is needed. For example, the number of prepaid times of a prepaid-card is rewritten every time it is used, and the data should be held even when it is taken off from the reader/writer. Therefore such data must be held on an EEPROM.

An IC card has programs and/or other important information enclosed in the chip, and is used to store important information or to perform crypto-processing therein. Conventionally, the difficulties to decrypt a ciphertext in an IC card have been considered to be equivalent to those to decrypt a cipher-algorithm. However if we observe and analyze the consumption current when an IC card is performing crypto-processing, it is suggested that the contents of crypto-processing or secret keys may be estimated easier than the decryption of crypto-algorithm. The consumption current can be observed by the measurement of a current supplied from a reader/writer. The details of this threatening attack are described on John Wiley & Amp; Sons, W. Rankl & Amp; W. Effing, "Smart Card Handbook", 8.5.1.1 Passive Protective Mechanisms (page 263).

CMOS which constitutes a chip of an IC card consumes current when its output conditions turn from 1 to 0 or from 0 to 1. In particular, in the data bus 203, because of the current for a bus driver, the static capacity of wirings and the transistors connected to the wirings, when the bus value is changed from 1 to 0 or 0 to 1, a large current flows. Therefore, when one observes the consumption current, there is a possibility that one may be able to estimate what is being operated inside the IC card chip.

FIG. 3 shows the waveform of a consumption current in a cycle of an IC card chip. Depending on the kind of data processing, the current waveform differs as 301 or 302 shown in the figure. The difference like this occurs depending on the kind of data flowing through the bus 203 or the data being processed in the CPU 201.

The coprocessor 202, in parallel to the CPU, for example, is able to perform a modular arithmetic operation of 512 bits. Therefore, it is possible to observe a consumption current of a waveform different from that of the CPU over a long time. By the observation of the characteristic waveform, the number of times of operations of the coprocessor can be easily estimated. If there is any relation between the operation times of the coprocessor and secret keys, there is a possibility that one can estimate the secret keys from the operation times of the coprocessor.

If there is a deviation depending on the secret keys in the contents of operation of the coprocessor, the deviation is obtained from the consumption current, and the secret keys can be estimated from it.

Also in the case of the CPU, similar circumstances exist. Since the number of bits of a secret key is known, if the consumption current is observed by changing the data to be processed, the influence of the bit value of the secret key might be able to be observed. If these waveforms of the consumption current are processed statistically, the secret key might be estimated.

3. SUMMARY OF THE INVENTION

An issue of the present invention is to decrease the relation between the data processing in an IC card chip and the consumption current. If the relationship between the consumption current and the processing in an IC card chip is decreased, it becomes difficult to estimate the processing inside the IC card chip or the secret key from the waveform of the consumption current observed. One of the viewpoint of the present invention is to change the processing order of the modular exponentiation calculation in which CRT (Chinese Remainder Theorem) is used in an IC-card chip so as not to be estimated by an attacker, and make it difficult to estimate the kind of processing or the secret keys from the waveforms of the consumption current. Another view point of the present invention is to change the order of data transfer to a register when executing an arithmetic sum or an arithmetic product on two register values so as not to be estimated by an attacker, thereby to make it difficult to estimate the kind of processing or the secret keys from the waveforms of the consumption current.

An object of the present invention is to provide a tamper-resistant processing method as a realizing means concerning the above-mentioned problem.

A tamper-resistant apparatus, represented by an IC-card chip, comprises a storage composed of a program storage unit for storing programs and a data storage unit for storing data, and a central processing unit (CPU) which executes the predetermined processes following the programs. The apparatus can be understood as an information processing device in which the programs, composed of processing instructions to be given to the CPU, provide one or more data processing means.

The first of the present invention is a method for decreasing the relationship between the data being processed and the consumption current of an IC card chip when processing a modular exponentiation calculation with the use of Chinese Remainder Theorem. The method is one for performing the calculation in a different order from the original processing order by dividing a modulus into prime factors and executing the modular exponentiation calculation based on the respective prime factor as a modulus.

The Chinese Remainder Theorem is that a remainder on modulus N is expressed by 2 prime factors of N which are mutually prime. For example, when a modulus N is a product of two mutually prime numbers, P and Q, as N=PQ, A MOD N is expressed by A MOD P and A MOD Q. As described in the above, when a modulus is divided into factors for expression, in particular, the modular exponentiation calculation can be improved in speed. In other words, in a case where N=PQ, when a modular exponentiation calculation, Y^X MOD N, is expressed with Y^X MOD P and Y^X MOD Q, we are able to write, Y^X MOD P=(Y MOD P)^(X MOD (P−1)) MOD P, Y^X MOD Q=(Y MOD Q)^(X MOD (Q−1)) MOD Q. Thus when P and Q are both in the order of N^(½), the data length of both Y and X becomes half. Thereby, the period of time required of each of these modular exponentiation calculations becomes about ⅛ of the time required of the data of the original length. This merit of high-speed is very large.

A modular exponentiation calculation is executed through reading the bit pattern of an index in order. In the well known algorithm such as the addition chain method or sliding window method, the index bits are taken out in order from the highest bits (or from the lowest bits) to perform processing in the combination of modular squaring and modular multiplication. The processing during these 2 modular exponentiation calculations is executed in the different order from the original one. For example, in an ordinary case, a unit process corresponding to the unit bits of the index of YP^XP MOD P is continued for the whole bit length of the index, and after that the processing of YQ^XQ MOD Q is executed.

The modular exponentiation processes based on the present invention are executed in a different order from the ordinary one, such as the partial processing of YP^XP MOD P→partial processing of YQ^XQ MOD P→partial processing of YQ^XQ MOD Q→partial processing of YP^XP MOD P→partial processing of YP^XP MOD P→partial processing of YQ^XQ MOD Q→. Thus, the attacker under the observation of the current will be perplexed. A higher effect can be achieved by determining the processing order at random (pseudo-random) instead of using a predetermined simple rule. In particular, this method makes the ordinary waveform obser-vation remarkably difficult where the waveforms of the current are averaged to eliminate noises.

The effect of the present invention can be further enhanced by the combination of methods shown in the following: a method in which the present invention is expressed as XP=(X MOD (P−1)+K(P−1), XQ=(X MOD (Q−1))+J(Q−1) (K, J are random numbers), and a method in which as the moduli, P and Q, are multiplied by random numbers instead of the original moduli.

The second of the present invention is a method for altering the order of data transfer necessary every time for the execution of binary arithmetics provided for a microcomputer, for example, arithmetic sum (+), arithmetic product (×), logical add, logical product, or exclusive OR. For example, when the arithmetic sum is performed for the data A and B stored in a RAM where the values are set on a source register RS and a destination register RD, in the ordinary case, the value of A is transferred to RS (or RD) and the value of B is transferred to RD (or RS), and after that, ADD RS, RD (this is assembler format, and it means calculating the arithmetic sum of RS and RD and storing the result in RD) is executed, but at that time the order of data transfer is fixed. In the present invention, the order of transferring the value of B to RD after transferring the value of A to RS, and transferring the value of A to RS after transferring the value of B to RD is changed, so that an attacker cannot estimate the order, resulting in that the attacker observing the current waveform will be perplexed. A higher effect can be achieved by determining the processing order at random (pseudo random) instead of using a predetermined simple rule. In particular, this method makes ordinary waveform observation remarkably difficult where the current waveforms are averaged to remove noises.

4. BRIEF DESCRIPTION OF THE DRAWINGS

FIG. 12 is a view showing an example (1) of the partial bit string of part of x;

FIG. 13 is a view showing an example (2) of the partial bit string of part of x;

FIG. 14 is a view showing an example (3) of the partial bit string of part of x;

FIG. 15 is a view showing an example (4) of the partial bit string of part of x;

FIG. 16 is a view showing an example of partial bit strings on XP and XP;

FIG. 23 is a view showing an example of the method of multiplication of 2 numerals, A and B, divided into bit blocks;

FIG. 28 is an operation table of an EXOR;

FIG. 29 is an operation table of AND; and

FIG. 30 is an operation table of OR.

5. DESCRIPTION OF THE PREFERRED EMBODIMENTS

As an introduction to the explanation of embodiments, a basic algorithm of modular exponentiation calculation in RAS cryptosystem using CRT, and the addition chain method and the sliding window system representative of modular exponentiation calculations will be explained.

In the RSA cryptosystem, a product N of 2 large primes P and Q, for example 512 bits each, and number E (in many IC cards, 3 or 65537 is used) which is mutually prime with N are adopted. Those numbers N and E are registered on a public key file as a public key. In this situation, a transmitter B transmits the data (a plaintext) M expressed by a number of larger than 1 and smaller than N−1 in an encrypted form, $$Y=M^E \text{ MOD } N,$$

to the possessor A of the public key, where $M^E$ is an expression showing Eth power of M. The possessor A who receives the ciphertext Y calculates with the use of the secret key X which satisfies the expression, XE MOD (P−1)(Q−1)=1, calculates $$Y^X \text{ MOD } N$$

In the above expression, (P−1)(Q−1) denotes the value of Euler's function F(N) in relation to N. This value is equal to the number of natural numbers which are mutually prime with N. According to the Euler's theorem, $$Y^{(P-1)(Q-1)} \text{ MOD } N=1$$

is established. On the other hand, since we are able to write XE=1+K(P−1)(Q−1) (K is an integer)

$$Y^{\wedge}X \text{ MOD } N$$
$$= (M^{\wedge}E)^{\wedge}X \text{ MOD } N$$
$$= M^{\wedge}(EX) \text{ MOD } N$$
$$= M^{\wedge}(1 + K(P-1)(Q-1)) \text{ MOD } N$$
$$= M * M^{\wedge}(K(P-1)(Q-1)) \text{ MOD } N$$
$$= M$$

is established. Therefore, the possessor A is able to restore the original plaintext M sent from the transmitter B by the calculation of $Y^{\wedge}X$ MOD N. In this case, for the calculation of the secret key X, prime factors P and Q of N are used. At present, the calculation method of X without using the prime factor dissolution is not known, and to factorize a product of large primes numbers requires unrealistic long period time. Thus even though N is made public, the possessor A's secret key is safe.

In the case of typical signature using IC card, small public exponent E (3 or 65537) is used for encryption. It has a meaning of shortening the calculation time for encryption, but it is because that even if the value of E is known to the public, a secret key index x or prime factors of N are not directly exposed to a threat of leak.

As a method of calculation, an addition chain method or the like is often adopted (refer to "Angouriron Nyuumon" ("E. Okamoto, An Introduction to the Theory of Cryptography, published by Kyoritsu shuppan on Feb. 25, 1993 (pages 94-97)")); however, with such an algorithm processing speed is slow, and the time required for a transaction utilizing an IC card may exceed the user's allowable time. Therefore, it is the CRT to produce M from the result of a modular exponentiation for 2 prime factors, P and Q, of the public modulus N, instead of simply performing the modular exponentiation for X and N.

Figure 1:
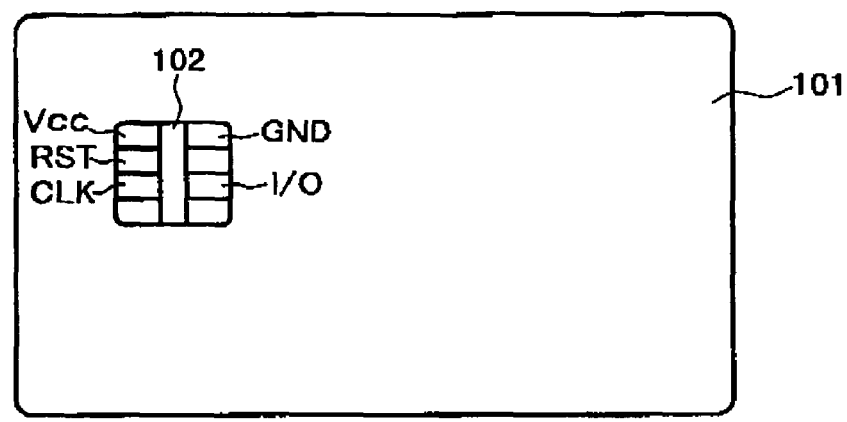
FIG. 1 is a schematic view and terminals of an IC card.
Figure 2:
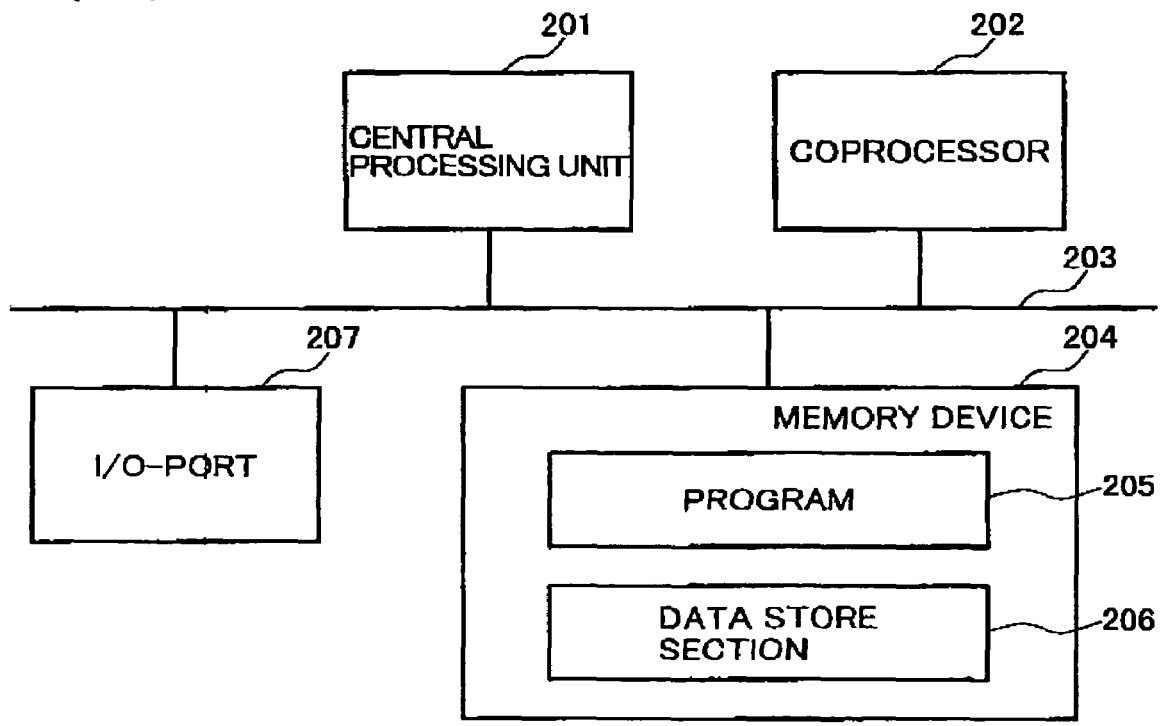
FIG. 2 is a block diagram of a microcomputer.
Figure 3:
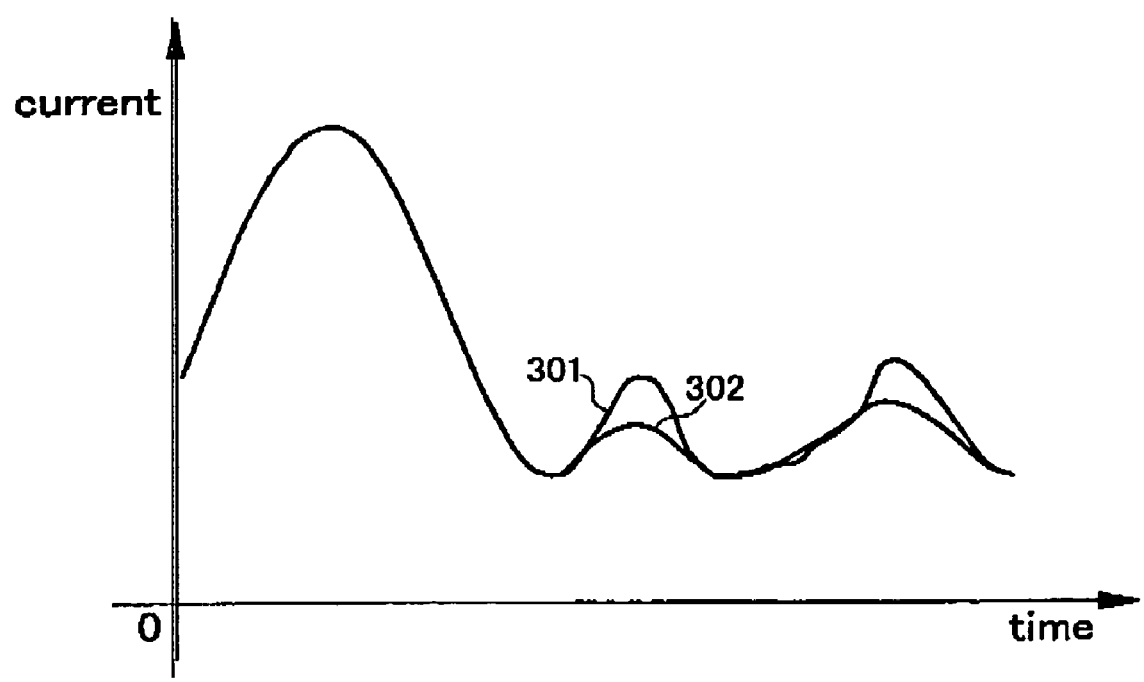
FIG. 3 is a waveform of the consumption current.
Figure 4:
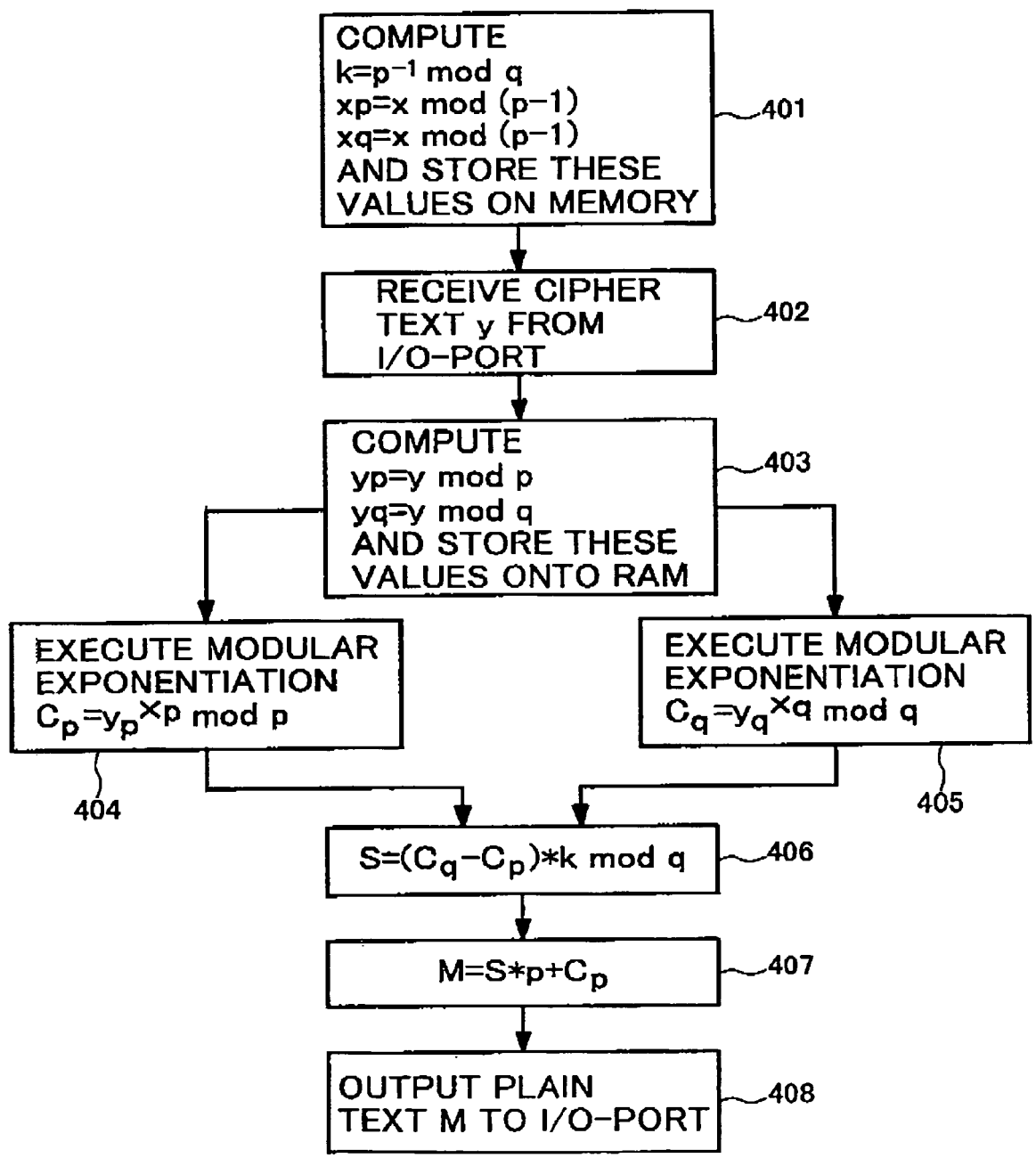
FIG. 4 is a view showing procedures of a modular exponentiation calculation in which Chinese remainder theorem is used.

The process of CRT will be briefly explained referring to FIG. 4. At first, a card 101 calculates the following values used in calculation; K=P^(−1) MOD Q, XP=X MOD (P−1) and XQ=X MOD (Q−1) (step 401). In this place in place of P−1, Q−1 we may be able to use their multiples. Usually, these values are stored in an EEPROM. Next, a ciphertext Y is received through the I/O port (step 402), and the remainders of ciphertext Y, YP=Y MOD P and YQ=Y MOD Q, are calculated with the use of prime factors P and Q or their multiples as moduli and the result is stored on a RAM (step 403). Next, two modular exponentiation calculations, $$CP=YP^{\wedge}XP \text{ MOD } P, CQ=YQ^{\wedge}XQ \text{ MOD } Q,$$

are performed (steps 404 and 405). Next, recombination calculations, $$S=(CQ-CP)*K \text{ MOD } Q$$

$$M=S*P+CP$$

are performed (steps 406 and 407), and a plaintext M is output through the I/O port (step 408). This M coincides with the actual $Y^{\wedge}X$ MOD N.

This fact will be confirmed numerically. Put the ciphertext Y=79, N=187 (=11*17), X=107. This x is a reciprocal of E=3 with respect to the Euler's function value of N, (11−1)*(17−1)=160. In this case, a real value is as follows.

$$M = 79\wedge 107 \text{ MOD } 187$$
$$= 79\wedge(5*3*7+2) \text{ MOD } 187$$
$$= 79\wedge 2*(79\wedge 5 \text{ MOD } 187)\wedge(3*7) \text{ MOD } 187$$
$$= 79\wedge 2*10\wedge(3*7) \text{ MOD } 187$$
$$= 79\wedge 2*(10\wedge 3 \text{ MOD } 187)\wedge 7 \text{ MOD } 187$$
$$= 79\wedge 2*(65\wedge 7 \text{ MOD } 187) \text{ MOD } 187$$
$$= 79\wedge 2*142 \text{ MOD } 187$$
$$= 29$$

This value will be calculated with the use of CRT. Since 11*14 MOD 17=1, then K=11^(-1) MOD 17=14, XP=107 MOD (11-1)=7, and XQ=107 MOD (17-1)=11. Also we obtain YP=79 MOD 11=2, and YQ=79 MOD 17=11. Since CP=2^7 MOD 11=7 and CQ=11^11 MOD 17=12, we obtain $$S=(12-7)*14 \text{ MOD } 17=2$$

$$M=2*11+7=29,$$

and this result coincides with the above value.

The reason why CRT makes processing speed higher is that: in the modular exponentiation calculation, the quantity of computation increases in proportion to the 3rd power of data length, whereas in the case of CRT, data of half length is calculated twice; therefore the quantity of computation is ⅛ when comparing with that in the case of modular exponentiation calculation. In the case of CRT, even if the calculation is executed twice, the total quantity of computation becomes ⅛*2=¼ of that of the modular exponentiation calculation. Actually because of the transformation of data or recombination calculation, processing speed is not graded up to 4 times speed, but actually it becomes in the order of 3 times.

Figure 5:
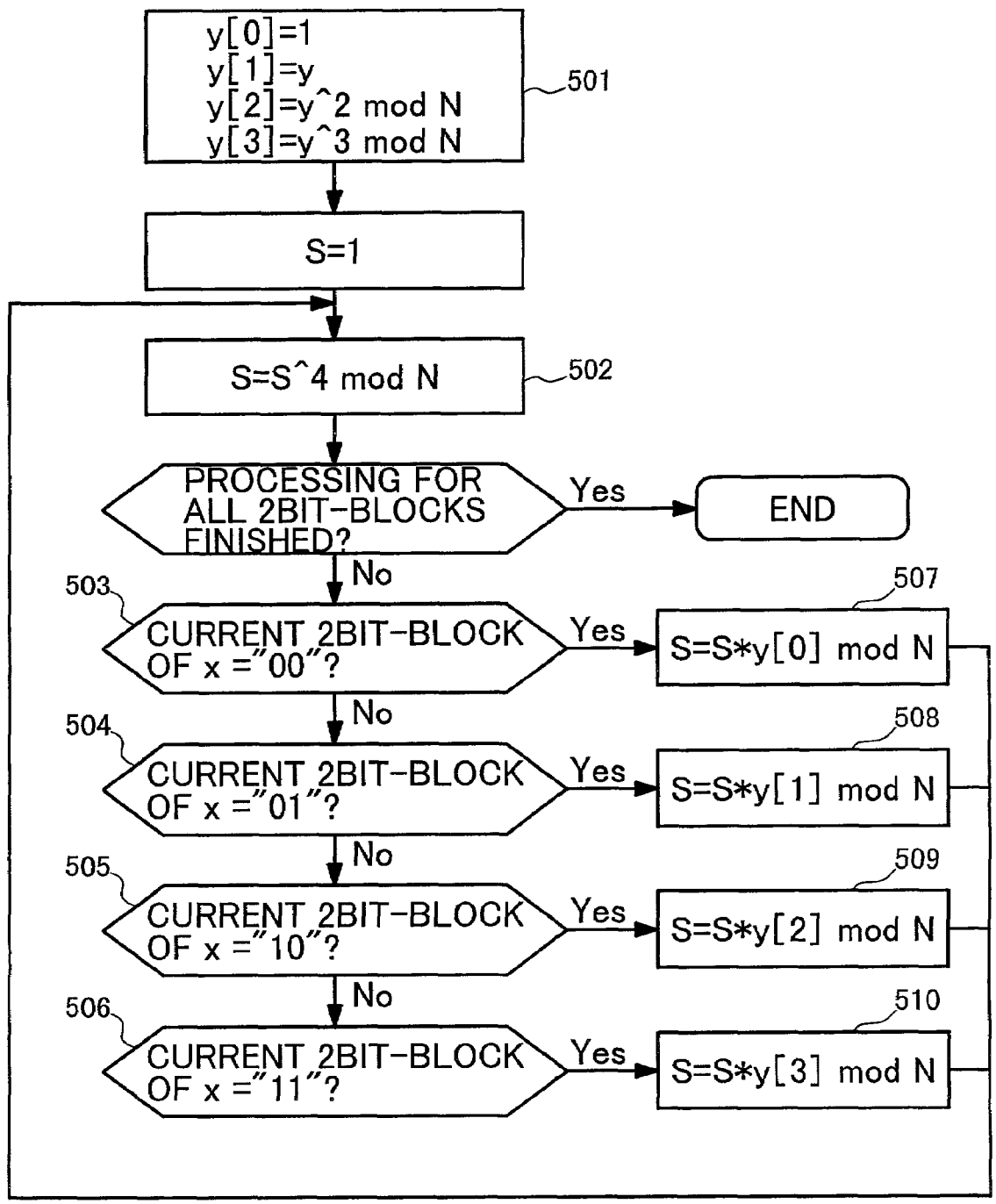
FIG. 5 is a view showing a modular exponentiation calculation algorithm according to a 2 bit addition chain method.

Next, a modular exponentiation algorithm according to the addition chain method will be explained referring to FIG. 5. This method is utilized in most cases. In the calculation of Y^X MOD N, the bit string of the secret key X are divided into 2 bit blocks and they are read from the highest bits in order. According to the block value which is any of 00, 01, 10 or 11, Y[0]=1, Y[1]=Y, Y[2]=Y^2 MOD N or Y[3]=Y^3 MOD N is applied respectively to X in the descending oeder from the highest (step 501), and by performing the modular multiplication calculation, the calculation of Y^X MOD N is realized. In the above, the division into 2 bit blocks is made for the convenience of explanation. In actual cases, blocks of 1 bit, 3 bits or 4 bits may be possible. The concept of the method is the same in any case. Next, 4th power calculation (step 502) is performed irrespective of the bit string of x, but in the next modular multiplication calculation which is performed by a card 101, according to the bit value (2-bit block is meant) of X, conditional branch is performed (steps 503, 504, 505, 506), and each step is subjected to a modular multiplication calculation at step 507, 508, 509 or 510 respectively.

It will be briefly confirmed that a correct calculation can be performed with this method by a numerical example. Since the essential part of this calculation method is an index portion, the following equation will be cited as an example with numerical value only in the index portion.

$$S=Y\wedge 219 \text{ MOD } N$$

By the binary expression, 219 is expressed 11011011. Based on this example, calculation is performed by the addition chain method of 2 bit width. When 11011011 is divided into 2 bit blacks corresponding to the process in step 501, it becomes 11 01 10 11. Initialization is performed on S (S=1), and then the 4th power in modulus N is obtained. Of course, 4th power of 1 is equal to 1. Next, pick up the leading bit block of the index portion. Since it is 11, S shall be multiplied by Y[3]=Y^3 MOD N, and S=Y^3 MOD N is obtained. Then looped back and by the 4th power of this in modulus N, Y^12 MOD N is obtained. Then pick up the second bit block from the beginning of the index portion. Since it is 01, S is multiplied by Y[1]=Y, and S=Y^13 MOD N is obtained. Looped back again and by the 4th power of this in modulus N, S=Y^52 MOD N is obtained. Then pick up the third bit block from the beginning of the index portion. Since it is 10, S is multiplied by Y[2]=Y^2 MOD N, and S=Y^54 MOD N is obtained. Looped back again and by the 4th power of this in modulus N, S=Y^216 MOD N is obtained. Then pick up the fourth bit block of the index portion. Since it is 11, S is multiplied by Y[1]=Y^3 MOD N, and S=Y^219 MOD N is obtained. This is a solution to be found.

As another representative modular exponentiation algorithm, sliding window method will be explained. This example of sliding window method is executed as shown in the following. In calculating the equation, S=Y^2226 MOD N, a table of Y[2]=Y^2 MOD N and Y[3]=Y^3 MOD N, are prepared. In this case, Y[0] and Y[1] are not needed. A numeral 2226 is written 100010110010 in binary expression. Examine this bit string in the descending order, and when a 2 bit block has 1 at the higher order, we regard it as one group, and when independent 0 continues, it is assumed that a modular square arithmetic operation is executed. In short, we understand 100010110010 can be resolved into 10, 0, 0, 10, 11, 0, 0, 10. Therefore, after the initialization to S=1, at first, the process corresponding to 10, that is, a modular 4th power arithmetic operation of S is executed, and S is multiplied by Y[2]. In this case, we put S=Y[2]=Y^2 MOD N. Next the process corresponding to 0, that is, modular square arithmetic operation is executed, and we obtain S=Y^4 MOD N. The process corresponding to a succeeding 0, S=Y^8 MOD N, is executed. Next when the process corresponding to 10 is executed, we obtain S=((Y^8 MOD N)^4 MOD N*Y^2 MOD N) MOD N=Y^34 MOD N. In the following process, corresponding to 11, S=((Y^34 MOD N)^4*Y^3 MOD N) MOD N=Y^139 MOD N is executed. Corresponding to further continuing 00, a modular 4th power arithmetic operation is executed, and we obtain S=(Y^139 MOD N)^4 MOD N=Y^556 MOD N, and in the final step, corresponding to the last 10, we obtaine S=((Y^556 MOD N)^4 MOD N*Y^2 MOD N) MOD N=Y^2226 MOD N. Thus we obtain a solution to be found. Since in this method only the index bits having the leading bit of 1 is placed on the table, the capacity of RAM required for that is half of that of other methods.

Note the that above-mentioned addition chain method and sliding window method can be executed with the use of a technique called the Montgomery method. The Montgomery method is one to be used for the high speed execution of the modular multiplication arithmetic operation, AB MOD N. In particular, it is suited to implementation by hardware. The algorithm of the method will be briefly explained. Details are described in Montgomery's work, "Modular Multiplication Without Trial Division", Mathematics of Computation 44, 170, pp. 519 to 521 (1985).

The essence of Montgomery method lies in utilizing the fact that, in almost all computers, the arithmetic operation of MOD $2^N$ can be realized by neglecting higher order bits. In other words, the essence of Montgomery method lies in that the calculation of AB MOD N is replaced by arithmetic operations in modulus (power of 2). In RSA cryptosystem, N is a product of large primes; therefore N is an odd number and mutually prime with nth power of 2 (n: arbitrary integer). Then we are able to consider a diophantine equation having unknowns, M and W, $$AB+MN=WR$$

where it is assumed that the bit length of A and B is N, and $R=2^N$. In this case, this equation has infinite number of solutions. If we are able to find M like this, W is congruent with $ABR^{\wedge}(-1)$ MOD N. Since M's are arranged regularly with intervals of R, M is able to take any nonnegative value smaller than the value of R. In this case, W is $ABR^{\wedge}(-1)$ MOD N or $ABR^{\wedge}(-1)$ MOD N+N. In the case of the latter, N is subtracted from W to obtain a target solution.

As mentioned in the above, in the Montgomery method, arithmetic operation is performed in the form of $ABR^{\wedge}(-1)$ MOD N. Therefore, in the above-mentioned algorithm, for example, in the table preparation process executed in step 501 shown in FIG. 5, respective table values are replaced by the values, Y[0]=R MOD N, Y[1]=YR MOD N, Y[2]=Y^2R MOD N, Y[3]=Y^3R MOD N for the succeeding processing. The initial value of S is also set to R MOD N. Then the values of multiplicand A and that of multiplier B are both become R times of the original value respectively; therefore, in the process of $ABR^{\wedge}(-1)$ MOD N, a term of R times remains. If we call this format a Montgomery format, both addition chain method and sliding window method are executed in Montgomery format and at the final step, when the result of calculation is multiplied by $R^{\wedge}(-1)$ MOD N, a solution to be found can be obtained. Also for the processing with the use of Montgomery method, the method according to the present invention essentially does not need any modification.

Figure 6:
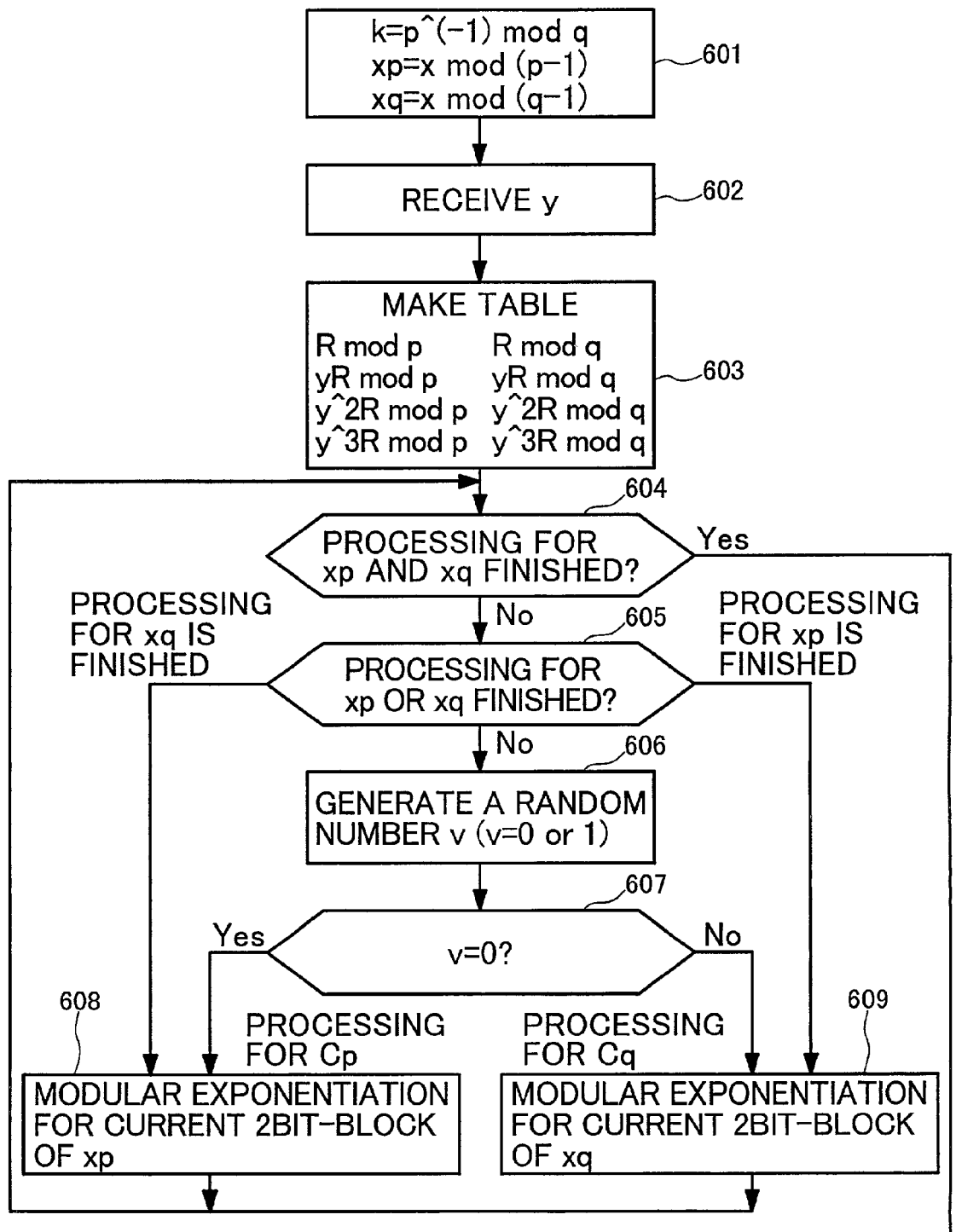
FIG. 6 is a view showing an embodiment concerning a modular exponentiation calculation algorithm according to the 2 bit addition chain method.
Figure 7:
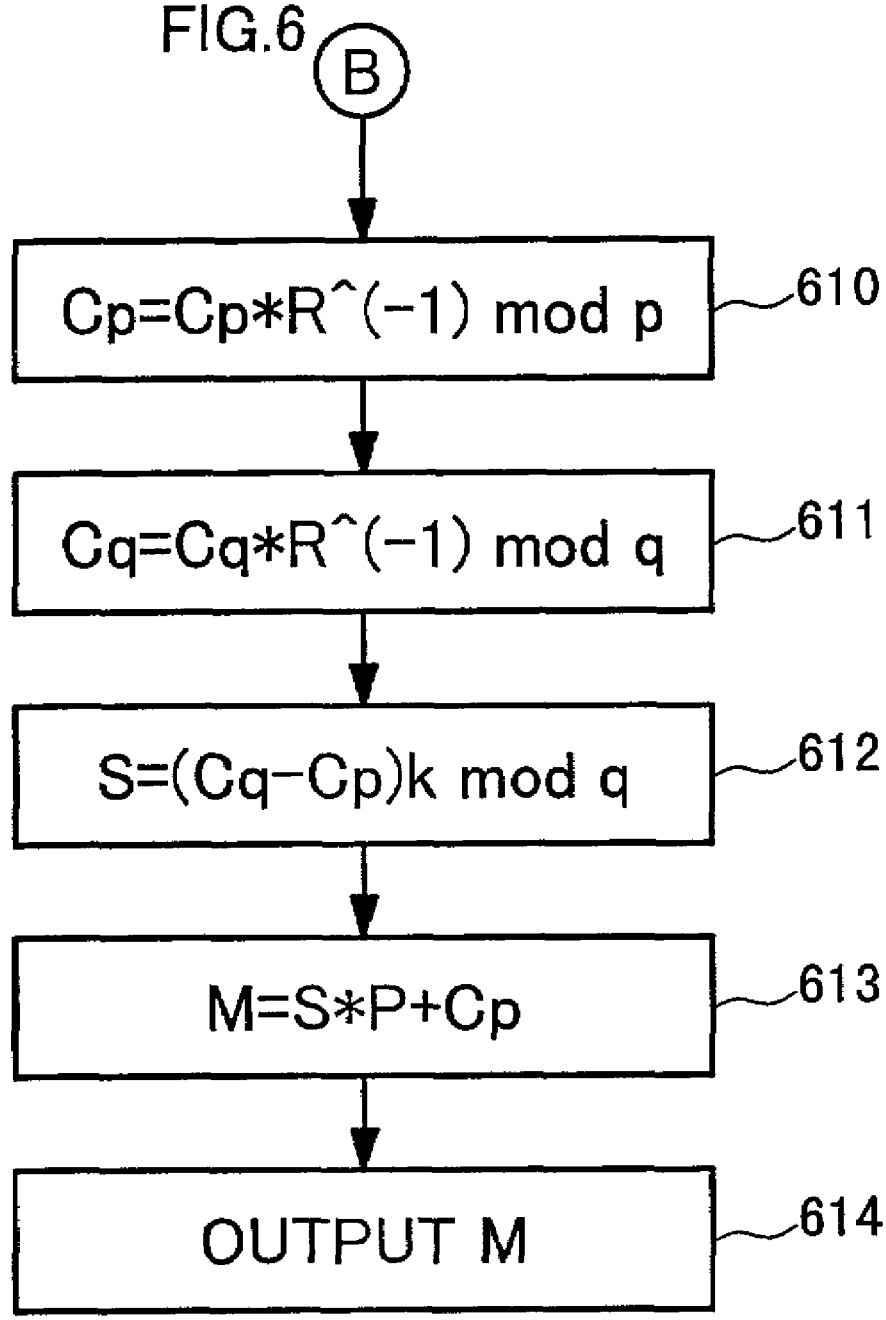
FIG. 7 is a view showing an embodiment concerning a modular exponentiation calculation algorithm according to the 2 bit addition chain method (continued from FIG. 6)

Following the above-described preparatory explanations, embodiments according to the present invention will be explained. Referring to FIG. 6 and FIG. 7, explanation will be made, where a modular multiplication operation is performed using Montgomery method and 2 bit-addition chain method is used. In the RSA cryptosystem, when executing M=Y^X MOD N (N=PQ), which decrypts a ciphertext y with the use of modulus N and the secret key index X, at first, the preprocessing calculation for CRT prepares K=P^(-1) MOD Q, XP=X MOD (P-1) and XQ=X MOD (Q-1) to store on an EEPROM (step 601) The ciphertext Y is received (step 602), and a table transformed to the 2 bit Montgomery format is prepared (step 603). This table is composed of both values in modulus P and values in modulus Q, wherein P and Q are prime factors of N. In other words, R MOD P, YR MOD P, Y^2R MOD P, Y^3R MOD P, R MOD Q, YR MOD Q, Y^2R MOD Q and Y^3R MOD Q are prepared. This table is necessary for the 2 bit addition chain processing for 2 modular exponentiation processes, CP=(Y MOD P)^XP MOD P and CQ=(Y MOD Q)^XQ MOD Q in CRT. It is judged whether these 2 modular exponentiation processes are finished or not at conditional branch processes of steps 604 and 605. The branch process at step 604 is one for judging if the whole bit string of XP and XQ have been processed. If the processing of all bits are finished, the process is transferred to step 610. In steps 610 and 611, conversion processes of CP and CQ from Montgomery format to the ordinary format, CP=CP*R^(-1) MOD P and CQ=CQ*R^(-1) MOD Q, are executed. In step 612, S=(CQ-CP)*K MOD Q is obtained, then in the following step 613, M=S*P+CP is obtained, and finally the value M is output. On the other hand, if the process of at least either one of XP or XQ is not finished, the conditional branch in step 604 is passed through and the process moves to the conditional branch at step 605. At step 605, whether XP or XQ is finished or not is judged. If both are not finished, the process advances to the process of step 606. In step 606, 1 bit random number V is generated. If V is 0, the CP process (step 608) is executed, and if V is 1, the CQ process (step 609) is executed, and after finishing the process, the process goes back to step 604.

Figure 8:
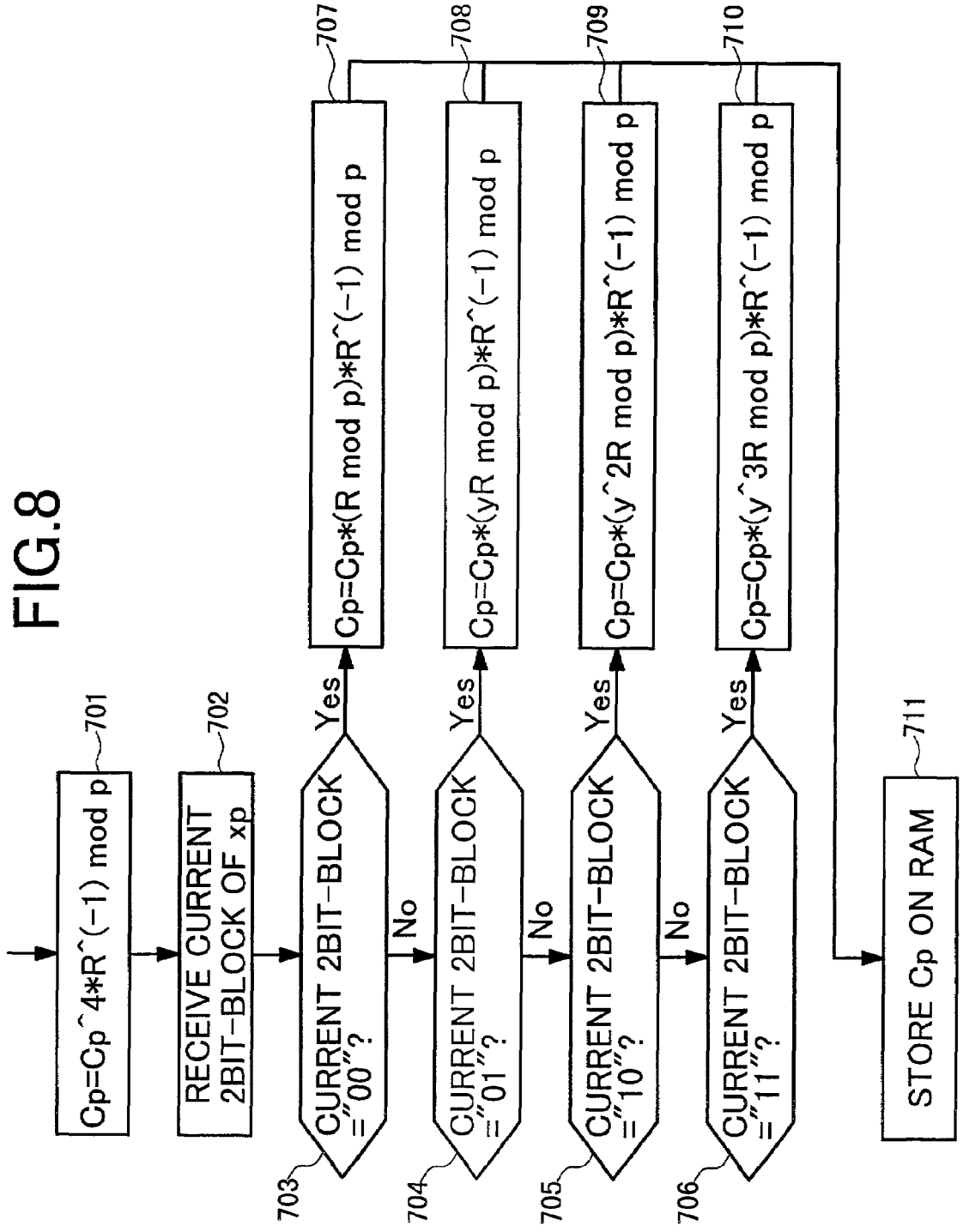
FIG. 8 is a view showing a modular multiplication processing routine (Montgomery method) on every 2 bit block in an embodiment.

The process for CP and CQ are shown in FIG. 8. In the figure the case of CP is drawn and the process for CQ is the same. For the process shown in FIG. 8, at first, a modular 4th power multiplication is executed. Since it is executed by Montgomery method, a factor, R^(-1) MOD P, is contained, but essentially it may be considered to be an ordinary modular 4th power multiplication. Next, current 2 bit block in the index portion is received (step 702). According to the bit block value: 00, 01, 10 or 11, process is branched to step 707, 708, 709 or 710 (step 703, 704, 705, 705). Since the processes in steps 707, 708, 709 and 710 are different from each other only in multipliers, and except these points they are the same process, only the case of branch from step 705 will be explained. In this case, a Montgomery modular multiplication is performed by multiplying Y^2R MOD P, and when the process is finished, the value of CP is written back on the RAM (step 711). The other cases are the same as the above. Since at step 605 if XP is finished, the process of CP is finished, the process of CQ (step 609) is executed. If XQ is finished, the process of CQ is finished, so that the process of CP (step 608) is executed. It is obvious that the correct values of CP and CQ are obtained with these processes.

An attacker who analyzes the consumption current during the execution of the program running based on the present embodiment will see a different current pattern from the ordinary processing order. In particular, since in the present embodiment, processing sequence is selected at random, a different processing sequence is observed every time of execution. For example, the original bit pattern of XP is assumed to be 10 11 00 10, and that of XQ is 11 00 01 11. In an ordinary case, after the process of CP is finished the process of CQ is executed or vice versa. Therefore, the processing sequence observed in the ordinary CRT process has 10 11 00 10 11 00 01 11. On the other hand, the CRT processing sequence according to the present embodiment produces the different processing sequence every time of execution. For example, when the random number V for branch is 0 1 1 0 0 1 0 1, the CRT processing sequence becomes 10 11 00 11 00 01 10 11, and if V=1 1 0 0 0 1 1 0, the CRT processing sequence becomes 11 00 10 11 00 01 11 10. In the ordinary processing it corresponds to V=0 0 0 0 1 1 1 1. Rewritten for easy comparison, they are as follows:

process in the ordinary CRT:
   10 11 00 10 11 00 01 11
process example 1 in the embodiment
   10 11 00 11 00 01 10 11
process example 2 in the embodiment
   11 00 10 11 00 01 11 10

As seen from the above, it becomes difficult to estimate the original processing sequence from the scrambled processing sequence. In an actual current waveform observation, usually a plurality of waveforms are averaged at respective time points to remove noises (the method of removing noise by averaging is based on the law of large numbers in the theory of probability). In this case, the averaged waveform is observed as the average of waveforms for the bit values of different waveforms by the effect of the scrambled processing order and the characteristics by the index disappear. Thereby the effect is further enhanced.

In the above embodiment, a processing unit on bit pattern corresponds to a 2-bit block, 00, 01, 10, 11, of XP and XQ. Even if the bit pattern is changed to a bit block of 1 bit, 3 bits, 4 bits and the like, the above process only comes to changing of the processing unit and the structure is the same.

In the present embodiment, conditional branch process is switched with a random number V; however it is easy to change this method to pseudo random numbers using a linear congruence method or the like, a chaotic sequence or a predetermined bit pattern, and the above alternatives have nothing to do with the essentials of the present invention.

Figure 9:
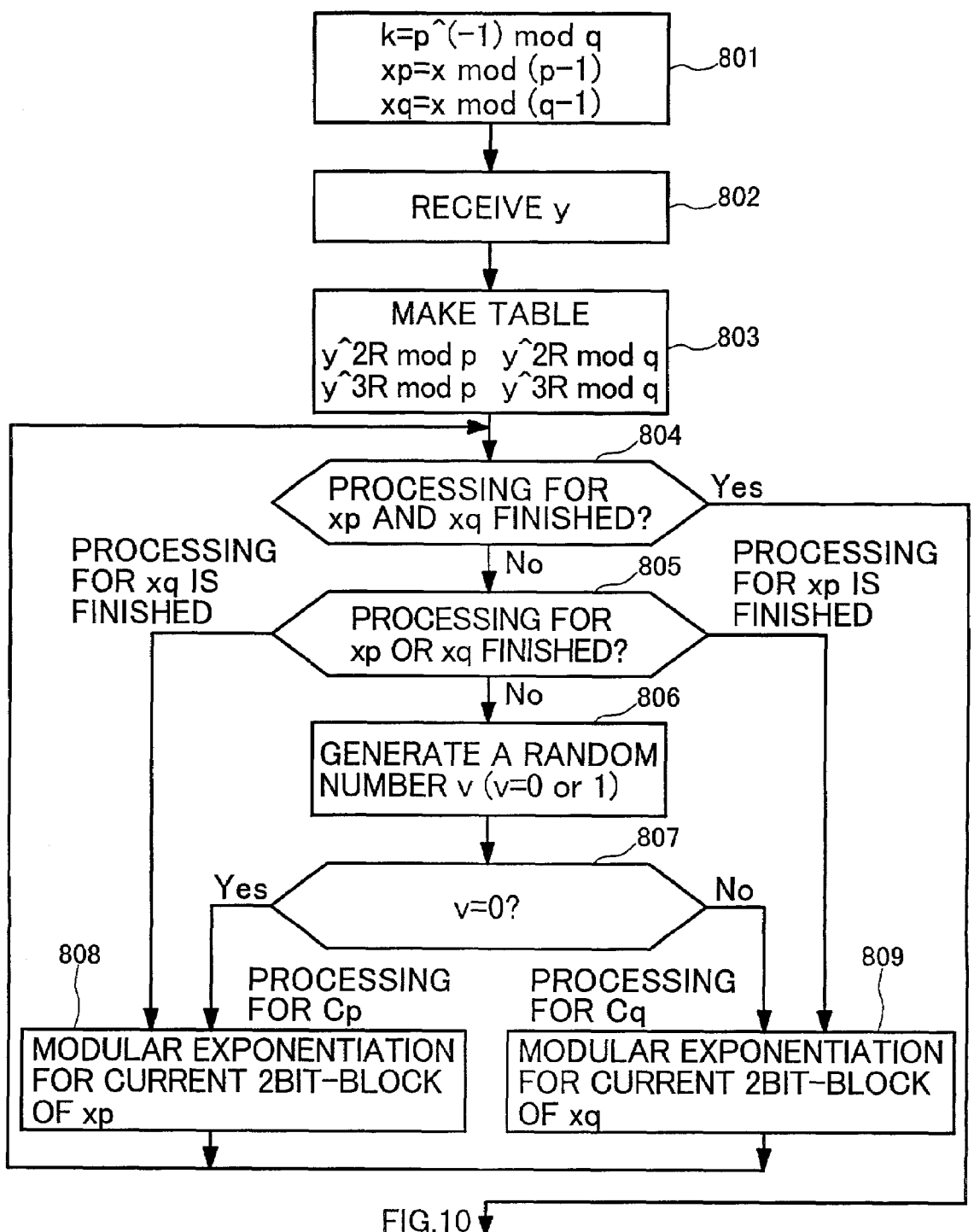
FIG. 9 is a view showing an embodiment concerning a modular exponentiation calculation according to 2 bit sliding window method.
Figure 10:
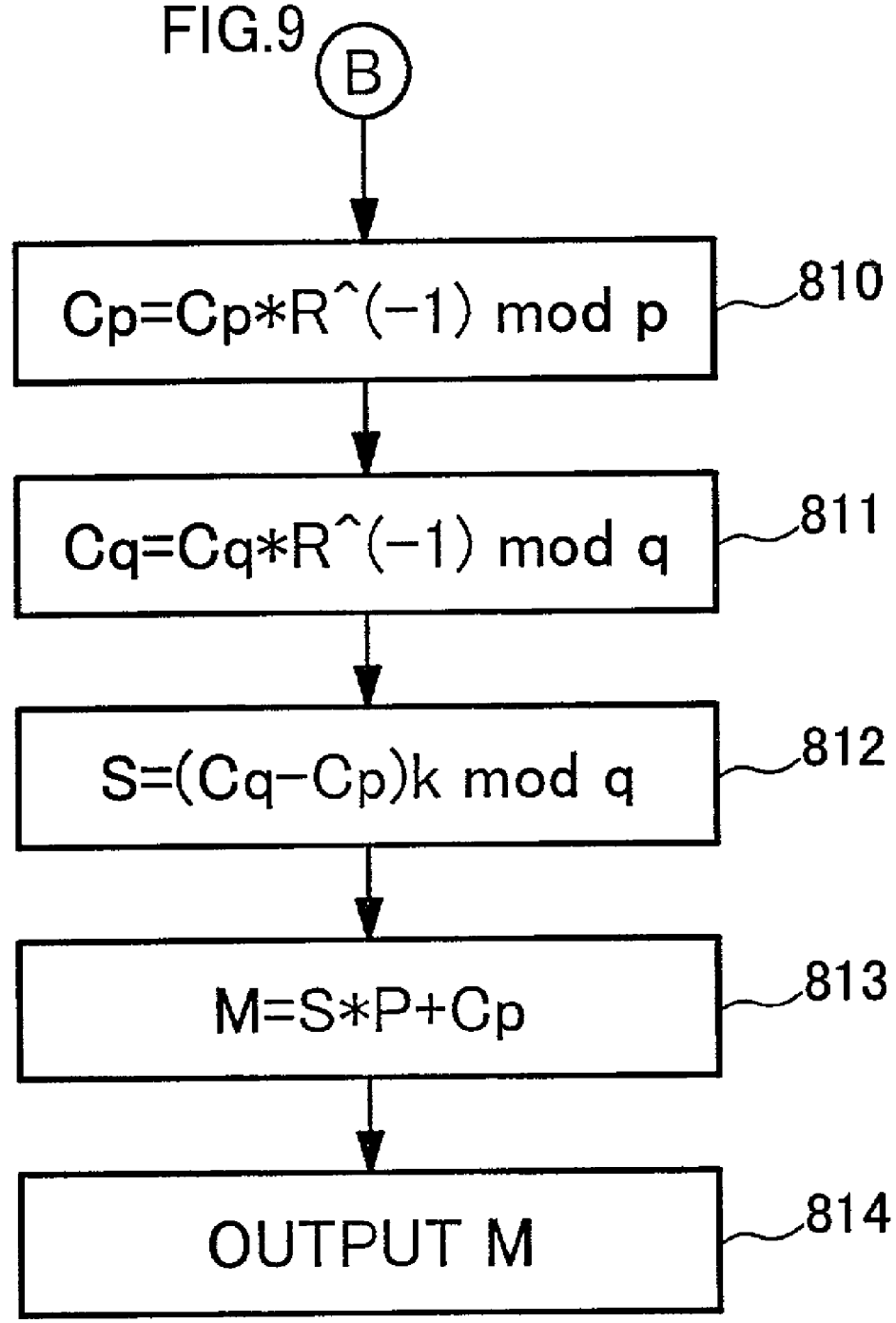
FIG. 10 is a view showing an embodiment concerning a modular exponentiation calculation according to 2 bit sliding window method (continued from FIG. 9)

In order to show another aspect of the "one processing unit on bit pattern" according to the present invention, the case of the sliding window method will be explained referring to FIGS. 9 and 10. Essentially this method is similar to the processing shown in FIGS. 6 and 7, but the handling of the index bits differs a little. To make the comparison easy, the case where the processing unit is 2 bits excepting the independent 0 will be shown. In the RSA cryptosystem, when executing $M=Y^X$ MOD N (N=PQ) which decrypts a ciphertext Y with the use of modulus N and the secret key index X, at first, the preprocessing calculation for CRT prepares $K=P^{(-1)}$ MOD Q, XP=X MOD (P-1) and XQ=X MOD (Q-1) to store on an EEPROM (step 801). The ciphertext Y is received (step 802), and a Montgomery format table is prepared which is one excluding the table values corresponding to 00, 01 from the table in the addition chain method (step 803). This table is composed of both values in modulus P and values in modulus Q, where P and Q are prime factors of N. In other words, $Y^2R$ MOD P, $Y^3$ R MOD P, $Y^2R$ MOD Q and $Y^3R$ MOD Q are prepared. This table is necessary for 2 bit sliding window processing for 2 modular exponentiation processes, $CP=(Y$ MOD $P)^{XP}$ MOD P and $CQ=(Y$ MOD $Q)^{XQ}$ MOD Q in CRT. It is judged if these 2 modular exponentiation processes are finished or not at conditional branch processes of steps 804 and 805. The branch process at step 804 is one for judging if the whole bit strings of XP and XQ have been processed. If the processing of all bits are finished, the process moves to step 810. In steps 810 and 811, conversion processes of CP and CQ from the Montgomery format to the ordinary format, $CP=CP*R^{(-1)}$ MOD P and $CQ=CQ*R^{(-1)}$ MOD Q, are executed. In step 812, S=(CQ-CP)*K MOD Q is obtained, then in the following step 813, M=S*P+CP is obtained, and finally this value M is output. On the other hand, if the process of at least either one of XP or XQ is not finished, the conditional branch in step 804 is passed through and the process moves to the conditional branch at step 805. At step 805, whether XP or XQ is finished or not is judged. If both are not finished, the process advances to the process of step 806. In step 806, 1 bit random number V is generated. If V is 0, CP process (step 808) is executed, and if V is 1, CQ process (step 805) is executed. After finishing the process, the processing moves back to step 804. In this place, the processing for CP (step 808) and the processing for CQ (step 809) mean the processing shown in FIG. 11. In the figure, the case of CP is drawn, and the processing for CQ is the same.

Figure 11:
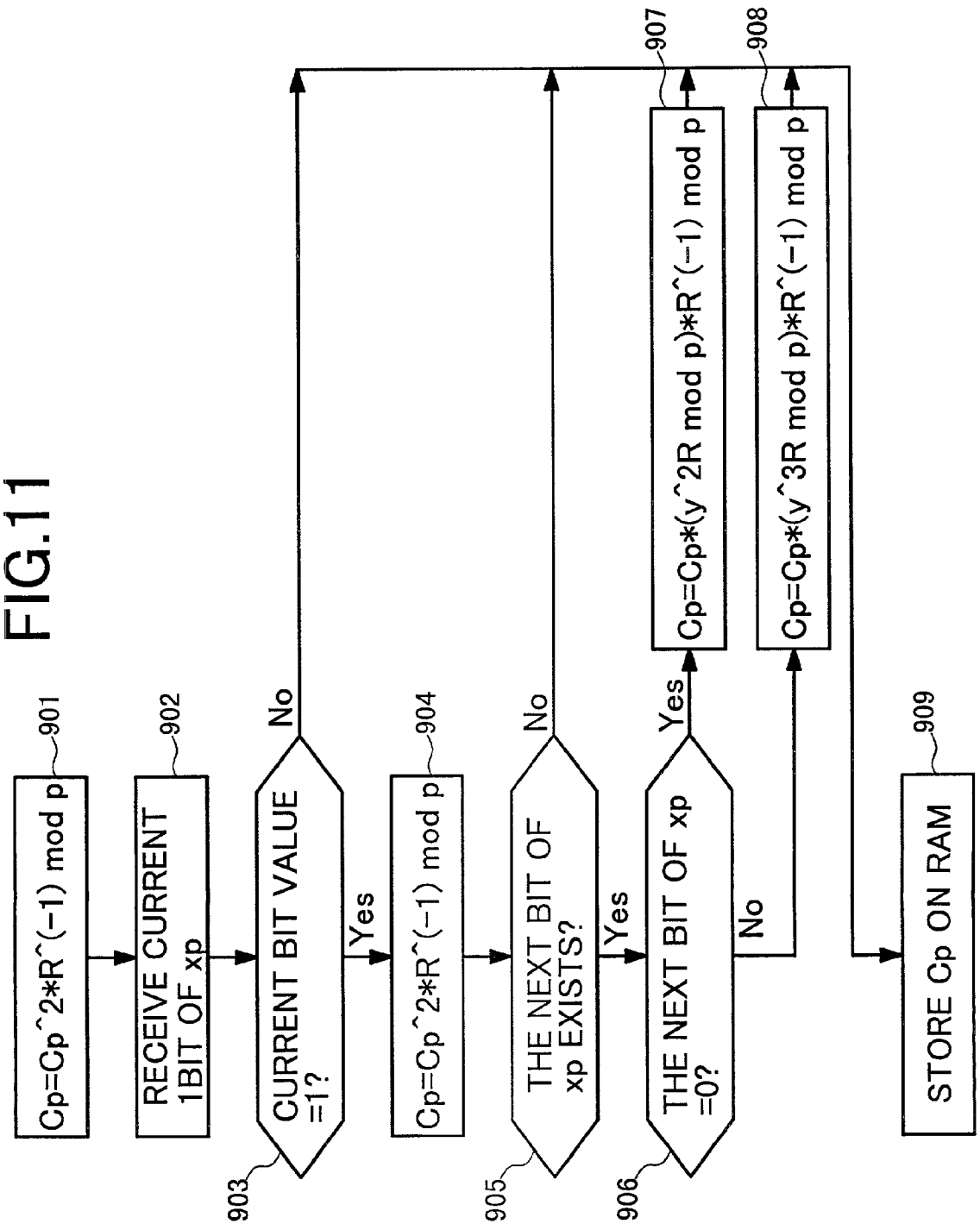
FIG. 11 is a view showing a modular multiplication processing routine (Montgomery method) according to sliding window method in an embodiment.

In the processing shown in FIG. 11, at first, a modular square multiplication processing is executed. Since the processing is executed by Montgomery method, a factor, $R^{(-1)}$ MOD P, is included, but essentially it is similar to a conventional modular square multiplication processing (note that a modular 4th power multiplication process is performed unconditionally in the addition chain method, whereas the sliding window method differs from the addition chain method in this point). Next, 1 bit of the index portion is received (step 902), and it is judged if the value is 1 or not (step 903). If the value is not 1, the process moves directly to step 909. If the bit value is 1 at step 903, a modular square calculation in Montgomery method is executed at step 904. Next, it is judged if a subsequent bit of XP exists (if it comes to the bit end) (step 905). If existent, it is judged if the bit value is 0 (step 906). If it is 0, the multiplication in Montgomery format, $CP=CP*(Y^2R$ MOD $P)*R^{(-1)}$ MOD P is executed (step 907). Otherwise it must be 1. Thus $CP=CP*(Y^3R$ MOD $P)*R^A(-1)$ MOD P is executed (step 908), then CP is stored on a RAM (step 909), and the modular multiplication process is finished. The process for CQ is the same as the above.

At step 805, if XP has been finished, the process for CP is completed, so that the process for CQ is executed (step 809). Inversely if XQ has been finished, the process for CQ is completed, so that the process for CP is executed (step 808). It is obvious that correct values of CP and CQ can be obtained by the above processes.

An attacker who analyzes the consumption current during the execution of the program running based on the present embodiment will see a different current pattern from the ordinary process order. In particular, since in the present embodiment, the processing sequence is selected at random, a different processing sequence is observed every time of execution. This situation will be explained by citing the same example as the previous one. The bit pattern of XP is assumed to be 10 11 00 10, and the bit pattern of XQ is 11 00 01 11. In an ordinary case, after the process of CP is finished, the process of CQ is executed or vice versa. Therefore, the processing sequence observed in the ordinary CRT process with the use of sliding window method has 10 11 00 10 11 00 01 11. On the other hand, the CRT processing according to the present embodiment produces the different processing sequence every time of execution. For example, if the random number V for branch is 0 1 1 0 0 1 0 1 0 1, the processing sequence becomes 10 11 0 11 0 0 0 0 10 11 1, and if V=1 1 0 0 0 1 1 0 1 0 1, the processing sequence becomes 11 0 10 11 0 0 0 0 11 10 1. In the ordinary process it corresponds to V=0 0 0 0 1 1 1 1. Rewritten for easy comparison, they are as follows in sliding window method, process in the ordinary CRT
  10 11 0 0 10 11 0 0 0 11 1
process example 1 in the present embodiment
  10 11 0 11 0 0 0 0 10 11 1
process example 2 in the present embodiment
  11 0 10 11 0 0 0 0 11 10 1.

As shown in the above, it becomes difficult to estimate the original processing sequence from the scrambled processing sequence.

In the above embodiment, one processing unit on a bit pattern is different from the case of XP, XQ in addition chain method. In the case of sliding window method, one processing unit on a bit pattern can be considered to be "0", "10", "11". Further, the number of bits for one processing unit can be increased like "0", "100", "101","110", "111". In the same way, it is easy to increase the bit width more. As described above, 'one processing unit on a bit pattern' referred in the present invention does not mean only the bit blocks having the same bit length, but those having different bit length can be allowed as in sliding window method.

In the present embodiment, the conditional branch process is switched with a random number, but it is easy to change the method to pseudo-random numbers using a linear congruence method, a chaotic sequence or a predetermined bit pattern, and the above alternatives have nothing to do with the essentials of the present invention.

In the above embodiment, CP and CQ are processed with the same method, but altering the method for one from another does not impair the concept of the present invention. For example, executing the processing for CP with addition chain method of 2 bit width while executing the processing for CQ with the above-mentioned 2 bit sliding window method is possible. Alternatively, executing the processing for CP with addition chain method of 2 bit width while executing the processing for CQ with addition chain method of 3 bit width is also possible. In the following, we are not going to cite examples on every cases, but it is natural to apply the present invention to the cases as mentioned above.

Next, in the above-mentioned two embodiments, the scrambled sequence was applied to all the bits of XP and XQ, but it will be shown that applying this technique to only part of each bit string is also effective.

In order to explain it, at first, the meaning of "a partial bit string of X" will be made clear. For the purpose of it, several examples will be cited. FIG. 12 shows how to divide X (X[N−1]X[N−2] . . . X[1]X[0]) in a binary expression, and 1002 is an example of "a partial bit string of X". FIG. 13 shows X partitioned off into 2 parts, and 1101 is an example of "a partial bit string of X". FIG. 14 shows the same division as that shown in FIG. 13. 1202 is an example of "a partial bit string of X". FIG. 15 shows X divided into 5 parts. The combination of part 1302 and 1304 is also an example of "a partial bit string of X".

As seen from the above examples, "a partial bit string of X" can be regarded as "a sum set of continuous partial bits of X". As we can easily see, there are many examples of "a partial bit string of X" in addition to those cited in the above. For simplification, we may refer to it as partial bit string BP on XP in the following.

In the CRT processing, we assume a partial bit string BP on the index XP and a partial bit string BQ on the index XQ as shown in FIG. 16. Suppose that here each component of the expression, XP=(XP[N−1]XP[N−2] . . . XP[1]XP[0] is a 2-bit block. In other words, XP[K] expresses one of the binary digits, 00, 01, 10 or 11. Therefore, N denotes the number of blocks. For example, when XP is 512 bits width, the number of blocks is 512/2=256. The same thing can be said about XQ.

Figure 17:
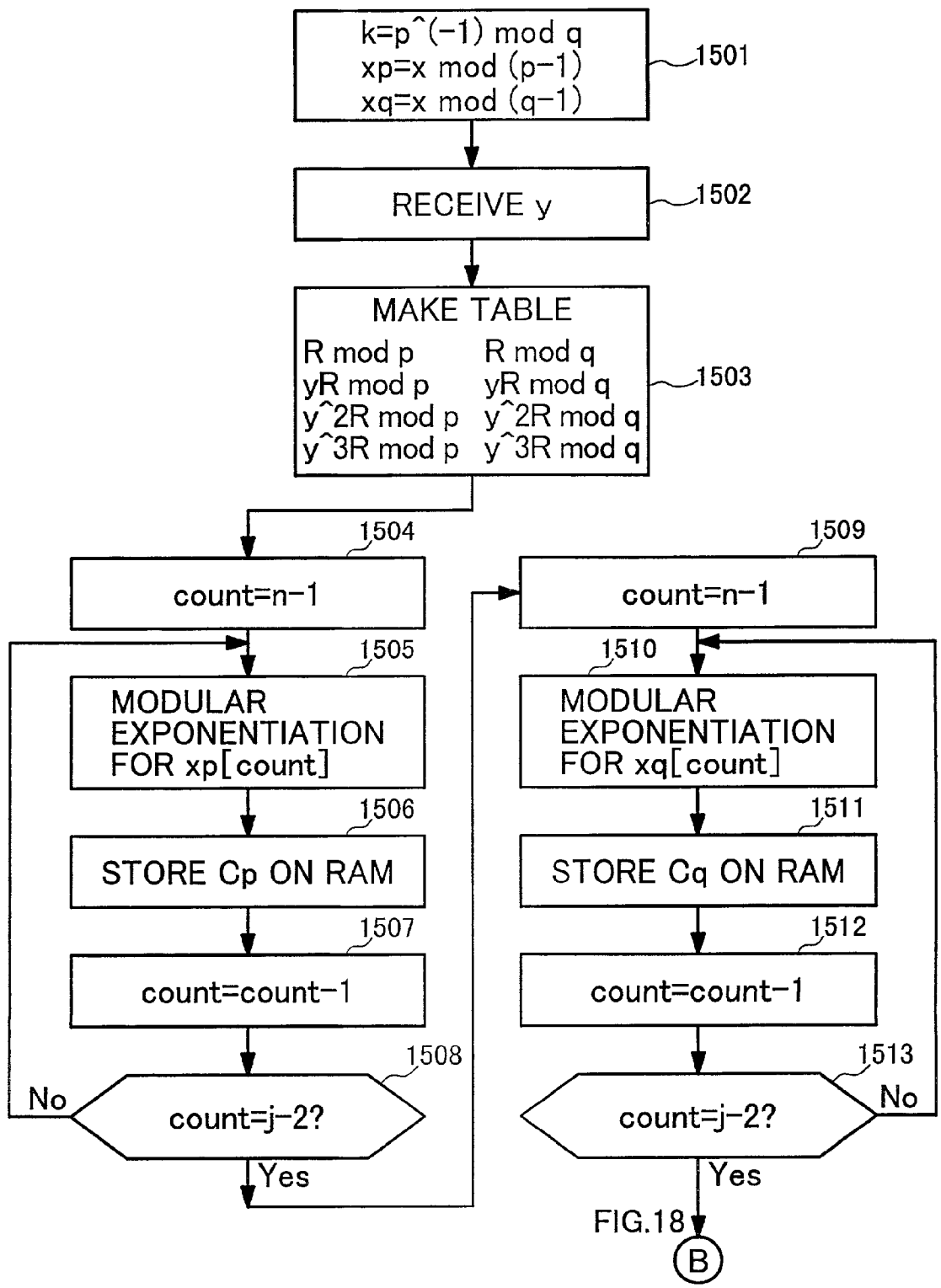
FIG. 17 is a view showing processing procedures to apply the present invention to the partial bit string in an embodiment.
Figure 18:
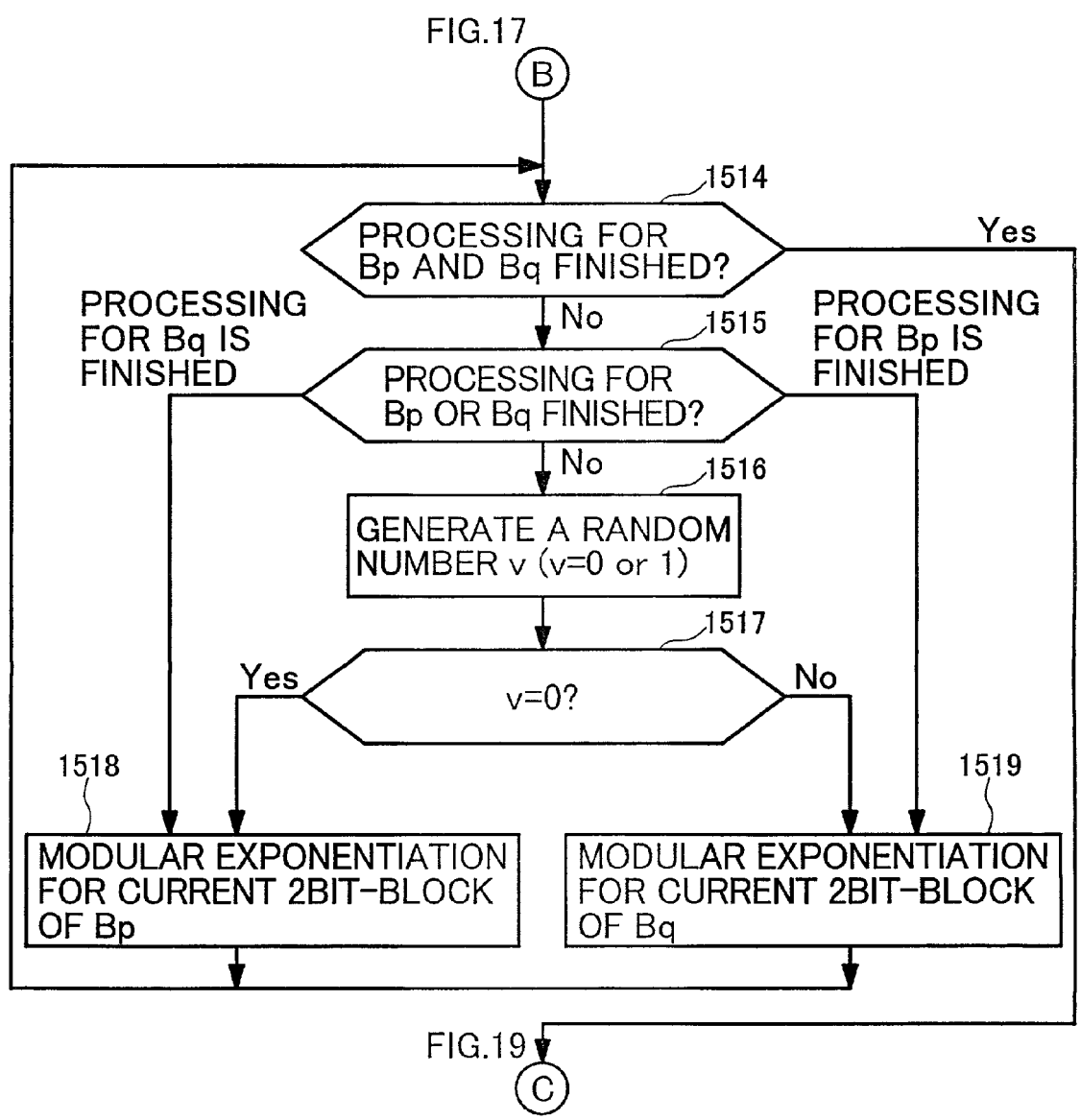
FIG. 18 is a view showing processing procedures to apply the present invention to the partial bit string in the embodiment (continued from FIG. 17)
Figure 19:
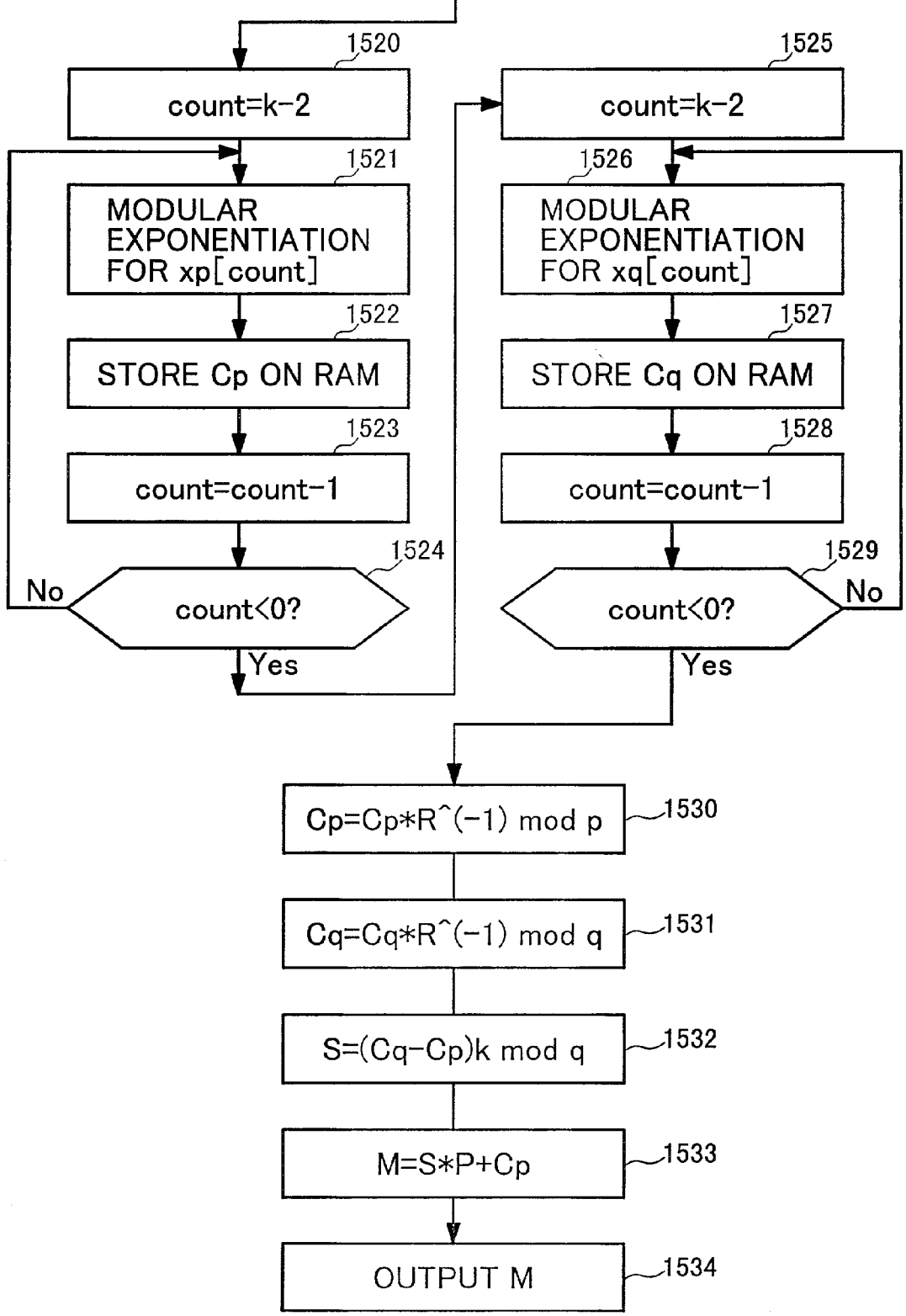
FIG. 19 is a view showing processing procedures to apply the present invention to the partial bit string in the embodiment (continued from FIG. 18)

In the RSA cryptosystem, when executing M=Y^X MOD N (N=PQ), which decrypts a ciphertext y with the use of the modulus N and the secret key index X, at first, the preprocessing calculation prepares, K=P^(−1) MOD Q, XP=X MOD (P−1) and XQ=X MOD (Q−1) to store them on an EEPROM (step 1501), as shown in FIGS. 17, 18, 19. The ciphertext Y is received (step 1502), and a table converted to 2 bit Montgomery format is prepared (step 1503). This table is composed of both values based on modulus P and values based on modulus Q (P, Q are prime factors of N). That is, R MOD P, YR MOD P, Y^2R MOD P, Y^3R MOD P, R MOD Q, YR MOD Q, Y^2R MOD Q and Y^3R MOD Q are prepared. This table is necessary for 2 bit addition chain processing for executing 2 modular exponentiation processes in CRT, CP=(Y MOD P)^XP MOD P and CQ=(Y MOD Q)^XQ MOD Q.

Next, the counter COUNT is set at N−1 (step 1504). Next, a modular multiplication calculation according to Montgomery format corresponding to XP[COUNT] is executed (step 1505). This process is essentially the same as the one shown in FIG. 8. In short, in the case of CP, after executing a modular 4th power multiplication, according to the value of XP[COUNT]: 00, 01, 10 or 11, modular multiplication process using Montgomery method is executed on R MOD P, YR MOD P, Y^2R MOD P or Y^3R MOD P respectively. After the process of step 1505, CP is stored on a RAM (step 1506), and the COUNT is decreased by 1 (step 1507). At the conditional branch process of step 1508, if the COUNT is not J−2, the process moves back to step 1505. If the COUNT is J−2, the process moves to the processing of CQ, and then the COUNT is set at N−1 again (step 1509). Next, a modular multiplication process is executed according to Montgomery format corresponding to XQ[COUNT] (step 1510). This process is essentially the same calculation as that shown in FIG. 8. After the completion of the process of step 1510, CQ is stored on a RAM. Note that storing areas for CP and CQ shall not be duplicated. It is because of the reason to prevent the overwriting by CP or CQ each other. In the following, it is assumed that variables (constants) called by different names are not duplicated on a RAM.

Next the explanation of the portion where the present invention is applied to BP and BQ will be explained. This portion has been explained already, but referring to figures explanation will be made again. At first, it is judged if all the bit blocks on BP and BQ have been processed or not (step 1514). If the processing on both portions has been finished, the process moves to step 1520. If both of them has not been finished, at least one of BP and BQ is not finished. At the conditional branch process of step 1515, it is judged if either one of BP and BQ has not been finished or both of them are not finished. When both of them are not finished, the process advances to the process of step 1516. In step 1516, 1 bit random number V is generated. At the conditional branch process of step 1517, if V=0, CP process is executed (1518). If V=1, CQ process is executed (step 1519). After finishing the process, the procedure moves back to step 1514. The processing for CP (step 1518) and the processing for CQ (step 1519) mean the processing shown in FIG. 8. In the figure, the case of CP is drawn, and the processing for CQ is the same. In step 1515, if the process of BP has been finished, the process of CP is finished, so that the process of CQ is executed (step 1519) Inversely if the process of BQ has been finished, the process of CQ is finished, so that the process of CP is executed (step 1518).

After the process of the scrambled sequence, the procedure moves to step 1520. Here the counter COUNT is set to K−2, where K is the K in X[K], and it is different variable from K in step 1532. Next, a modular multiplication operation corresponding to XP[COUNT] according to Montgomery format is executed (step 1521). This process is essentially the same calculation as that shown in FIG. 8. In short, in the case of CP, after the execution of a modular 4th power multiplication, according to the value of XP[COUNT]: 00, 01, 10 or 11, modular multiplication process using Montgomery method is executed on R MOD P, YR MOD P, Y^2R MOD P, or Y^3R MOD P, respectively. After the process of step 1521, CP is stored on a RAM (step 1522), and the COUNT is decreased by 1 (step 1523). At the conditional branch process of step 1524, if the COUNT is not negative, the procedure moves back to step 1521. If the COUNT is negative, the procedure moves to the processing of CQ, and then the COUNT is set to K−2 again (step 1525). Next, a modular multiplication calculation in the Montgomery format corresponding to XQ[COUNT] is executed (1526). This process is essentially the same as that shown in FIG. 8. After the process of step 1526 is finished, CQ is stored on the RAM (step 1527). Next, the COUNT is decreased by 1 (step 1528). At the conditional branch process of step 1529, if the COUNT is not negative, the procedure moves back to the process of step 1526. If the COUNT is negative, the procedure moves to the process of step 1530. In steps 1530 and 1531, the processes to write back CP and CQ from the Montgomery format to the ordinary format, CP=CP*R^(−1) MOD P and CQ=CQ*R^(−1) MOD Q are executed, and at step 1532, S=(CQ CP)*K MOD Q is executed. At the subsequent step 1533, we obtain M=S*P+CP and finally this value M is output. It is clear that by this process a correct value of M is obtained. An attacker who analyzes the consumption current during the execution of the program running based on the present embodiment will see a current pattern different from that in the ordinary processing order. In particular, since in the present embodiment, a processing sequence is selected at random, a different processing sequence is observed every time of execution.

In the embodiment shown in the above, BP and BQ are of the same bit position and the same size, but it has no relation with the essentials of the present invention. In other words, the size or the bit position of BP and BQ can be varied, and further such an irregular application is possible as either one of CP and CQ is processed according to addition chain method and another is processed according to sliding window method.

In the above embodiment as shown in FIG. 12, a comparatively simple bit positions are protected, but as mentioned previously in the definition portion of "a partial bit string of the index" it is also possible to protect more complicated positions as shown in FIG. 15.

Next, other embodiments will be explained. Before the explanation of the embodiments its background will be briefly explained.

Figure 20:
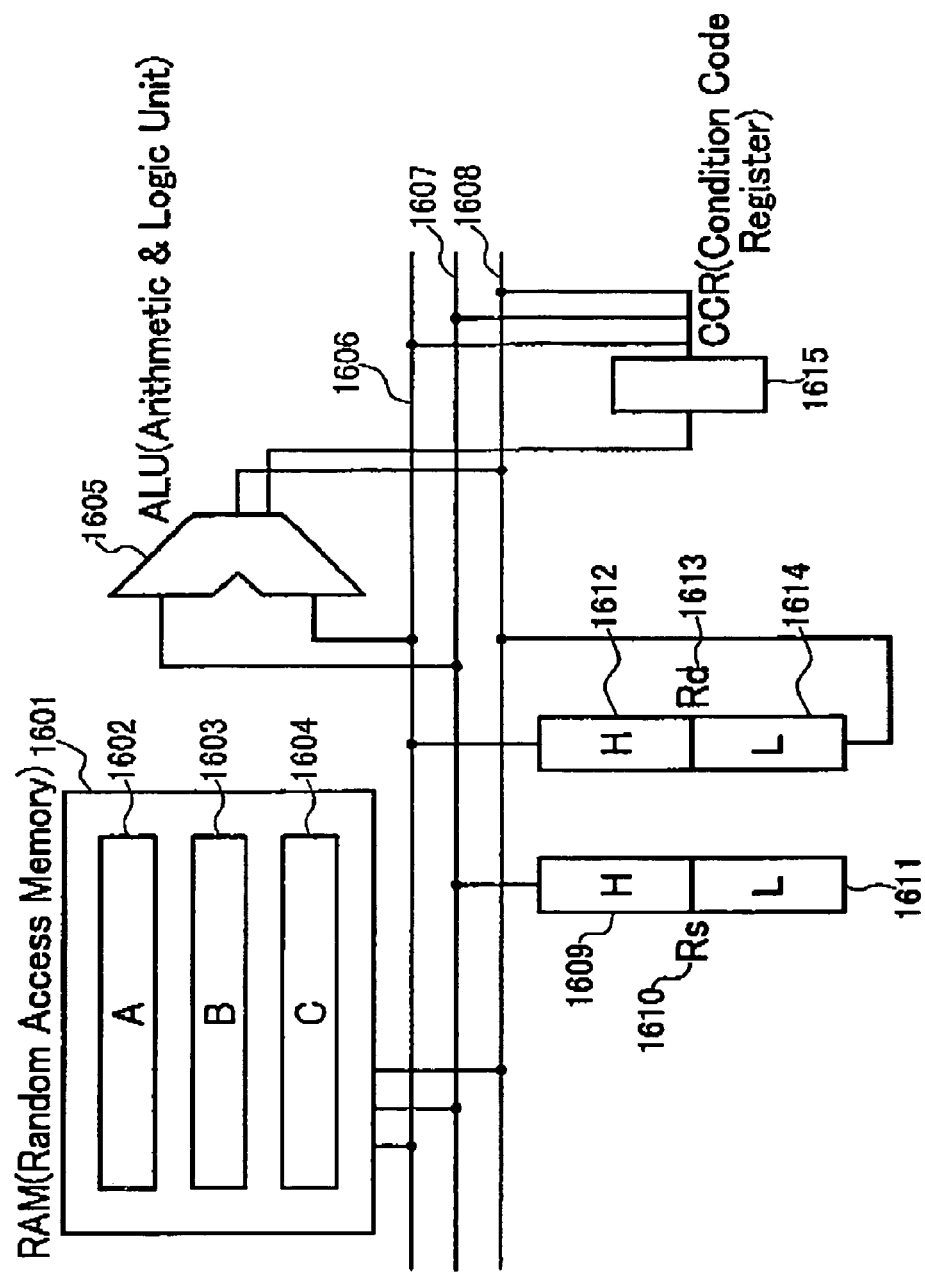
FIG. 20 is a view showing a n example of configuration of a central processing unit and a RAM of a microcomputer.

In general, in a microcomputer, a central processing unit (or a computing device such as a coprocessor) has temporary storage areas called registers. FIG. 20 shows the central processing unit of a microcomputer and a RAM (data storage). The RAM 1601 is a rewritable memory. In general, the data A and B shown in numerals 1602 and 1603 used for arithmetic operation are stored in this memory. The data handled as constants can be stored on a ROM or an EEPROM. The data C shown as 1604 is an area in which the result of operation is stored. The RAM 1601 itself is connected to data buses, 1606 and 1607 and a write bus 1608. The data read from the RAM are transferred to an arithmetic operation unit ALU (Arithmetic & Amp; logic unit) 1605 or to the registers 1610 and 1613.

For the convenience of explanation, it is assumed that ALU 1605 is an arithmetic operator of 8 bits width, and the width of each of bus lines, 1606, 1607 and 1608 is 16 bits. Explanation will be made for two registers. The register 1610 is used on the source side, and the register 1613 is used on the destination side. The registers 1610, 1613 each have the capacity of 16 bits and are composed of HIGH side 8 bits 1609, 1612 and LOW side 8 bits 1611, 1614 respectively. There is provided a CCR (Condition Code Register) 1615 for storing flags: flags showing the results of operation; for example, a 0 flag which shows 1 when the value of the result is 0, and which shows 0 if the result is not 0, or a carry-flag which shows carry up. The CCR is connected to the ALU 1605 and to the various kinds of buses (1606, 1607, 1608).

The configuration of the microcomputer mentioned in the above is a simplified one. In general, other than 8 bits CPU, there are 16 bits 32 bits or 64 bit CPUs, and there are CPUs having different number of registers having different capacity. Some microcomputers allot a predetermined area on RAM registers. For simplification, ROM or EEPROM (FRAM) are not shown, but programs are usually stored in either of them. Each instruction in the programs is decoded by a decoder (not shown in a figure) and is executed, which results in the execution of a program. The concept of the present invention has nothing to do with such difference in configuration, so that the explanation will be put forward based on the microcomputer shown in FIG. 20.

The ALU 1605 executes various kinds of binary arithmetics. Logical operations, AND (logical and), OR (logical or), XOR (exclusive or), and arithmetic operations, + (sum), − (subtraction), × (product), ÷ (quotient) are representative ones. (Arithmetic operations are composed of logical operations. Therefore, the circuit like ALU may be called a logic circuit) Binary arithmetics are usually executed in 2 ways as shown below.

Immediate method: an operation between a constant and a value of a register (ADD 01, RD, etc).

Register-to-register method: an operation between a value of a register and another value of another resister (ADD RS, RD, etc). The present invention relates to the latter "register-to-register method".

In order to explain the concept of the present invention clearly with all included, an example of addition between multi digit numbers will be cited. ADD.W is supposed to show a mnemonic code which expresses addition on a word with 16 bits width and with carry. For example, the addition of numbers A, B of 16*3 bits is performed by the 3 times repetition of ADD.W. In this case, carry up can occur with the operation beyond the word boundary.

Figure 21:
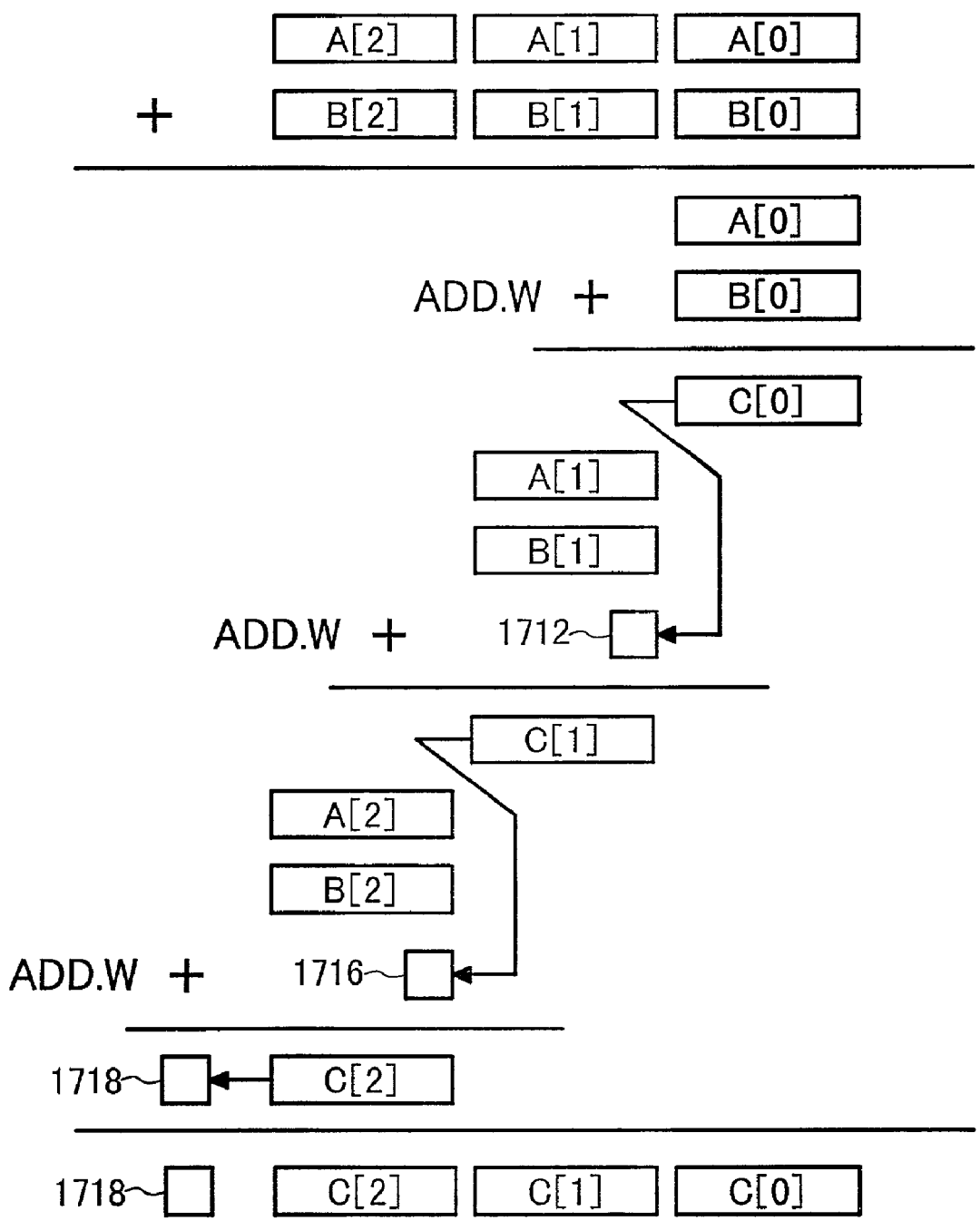
FIG. 21 is a view showing an example of the method of sum calculation of 2 numerals, A and B divided into bit blocks.

FIG. 21 shows the procedure of calculating the sum of a number A of 16*3 bits and a number B of the same 16*3 bits. A is composed of 3 words (16 bit block a word) These words are denoted as A[0], A[1], A[2] in ascending order. Similarly B is denoted as B[0], B[1], B[2]. The ADD.W instruction calculates the sum of A[0] and B[0] and output the sum C[0] and carry 1712. The carry is stored in a register called CCR (condition code register). Next the sum of bit blocks A[1] and B[1] and the carry 1712 in the previous calculation are calculated by ADD.W., which produces the sum C[1] and the carry 1716. Next the sum of bit blocks A[2] and B[2] and the newly obtained carry 1716 are calculated by ADD.W, which produces the sum C[2] and the carry 1718. The values placed in order from the highest, "carry 1718 C[2] C[1] C[0]" are the C, the sum of A and B.

The method to implement the above calculation method according to the present invention will be explained. As mentioned in the above, to calculate the sum of A and B with each size beyond the word size, A and B are divided into word-size blocks and the operation ADD.W is repeated by the number of blocks. In that case, the carry generated in each block portion is carried up in order for the next block processing, whereby the target sum is obtained. In principle, the sum of numbers with any number of digits each can be calculated.

Figure 22:
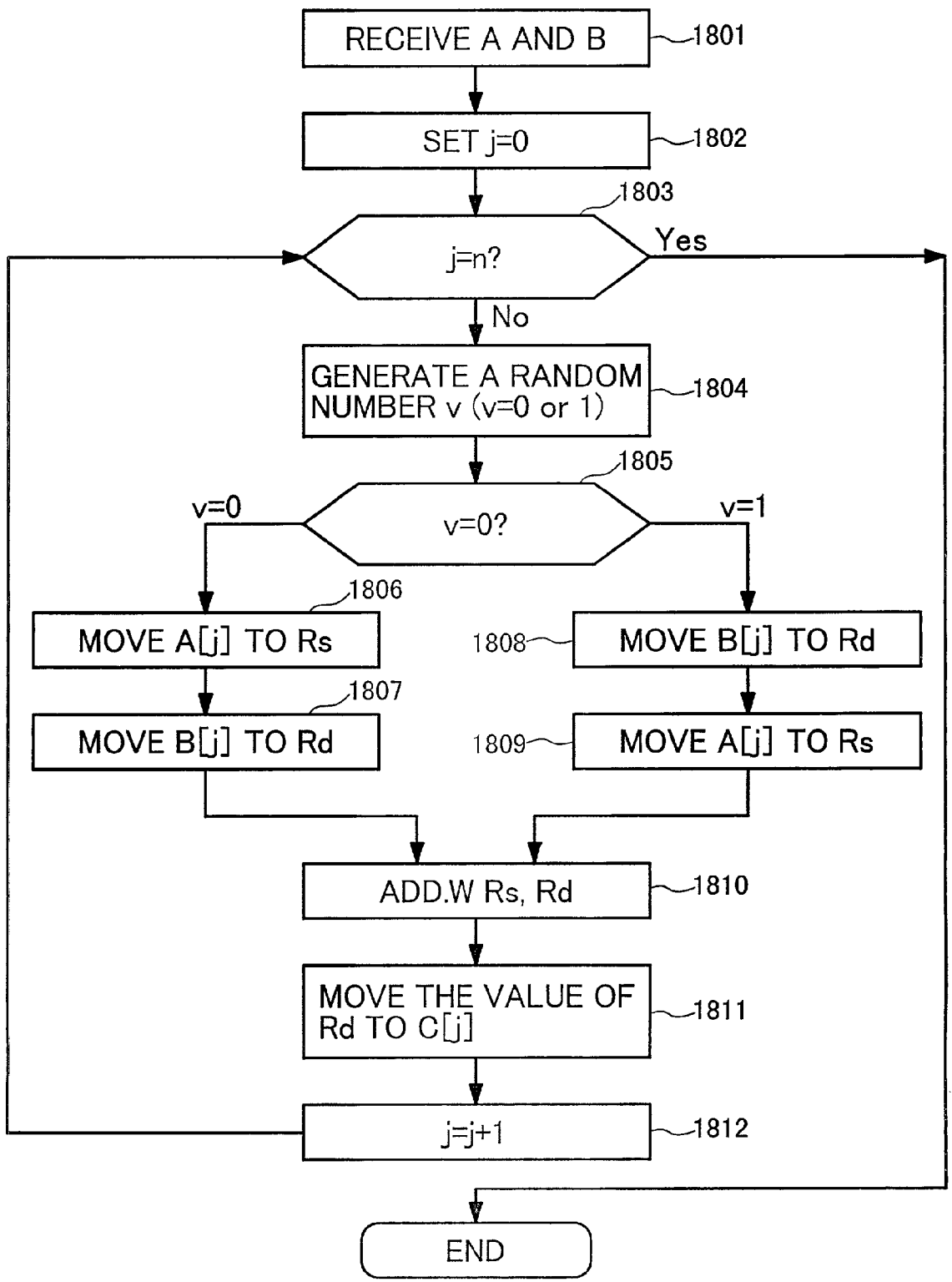
FIG. 22 is a view showing processing procedures of sum calculation in an embodiment.

In the following, we put: A=(A[N−1]A[N−2] . . . A[1]A [−0]), B=(B[N−1]B[N−2] . . . B[1]B[0]) (each of A[J] and B[J] is a 16-bit block). FIG. 22 shows the procedures of calculating the sum of A and B. At first, A and B are received (step 1801). In this place, "receive" means not only to receive the signals through the I/O port; but also to have A and B determined as a result of other calculation. Next, the counter J is initialized to 0 (step 1802). The conditional branch process (step 1803) judges if the counter is N or not.

When J=N, it means that all bit blocks have been processed, so that the processing is put to an end. If J is not N, the process is advanced to step 1804. At step 1804, 1 bit random number V is generated. After that, at the conditional branch process of step 1805, whether V is 0 or 1 is judged. In the case of 0, A[J] is transferred to the source register RS (step 1806). After that, B[J] is transferred to the destination register RD (step 1807). After that, ADD.W RS, RD is executed (step 1810). At step 1810, the sum of the values of RS and RD is calculated, and the value is transferred to RD. When a carry up occurs, it is held as a carry, and in the process of the next ADD.W, the process of adding 1 is executed. Since this portion is processed by the instruction of ADD.W, it is not written in the flow chart. A programmer of assembler language does not usually handle the processing of carry. Next, the contents of RD are stored onto the designated position C[J] on the RAM (step 1811). Next, J is incremented by 1 (step 1812), and the procedure is returned to the conditional branch process of step 1803. Inversely, when V is 1, B[J] is transferred to the destination register RD (step 1808). After that, A[J] is transferred to the source register RS (step 1809). After that, ADD.W RS, RD is executed (step 1810). At step 1810, the sum of the values of RS and RD is calculated, and the value is transferred to RD. If a carry up occurs, it is held as a carry, and in the process of the next ADD.W process, the process of adding 1 is executed. Next, the contents of RD are stored to the designated position C[J] on the RAM (step 1811). Next, J is incremented by 1 (step 1812), and the procedure moves back to the conditional branch process of step 1803.

In this process, a random number V is generated, and according to the value of it, the process is switched: either first A[J] is transferred to RS, and then B[J] is transferred to RD or inversely first B[J] is transferred to RD and then A[J] is transferred to RS. With the switching mentioned in the above, the waveform of the consumption current of an IC chip is varied, in particular if one tries the process of averaging the waveforms to eliminate noises for observing the difference of data (for the typical oscilloscope, noises are eliminated by this method), the waveform is observed only as the mean value of A and B; therefore it is difficult to estimate the contents of each of them. Although not showing an example, it is easy to limit the present embodiment to the sum of a single 16 bit-block. In the present embodiment, conditional branch process is switched with the a random number v, but it is easy to change it to pseudo random number using linear congruence method, etc., chaotic sequence or a predetermined bit pattern, and the above alternatives have nothing to do with the essentials of the present invention.

Figure 23:
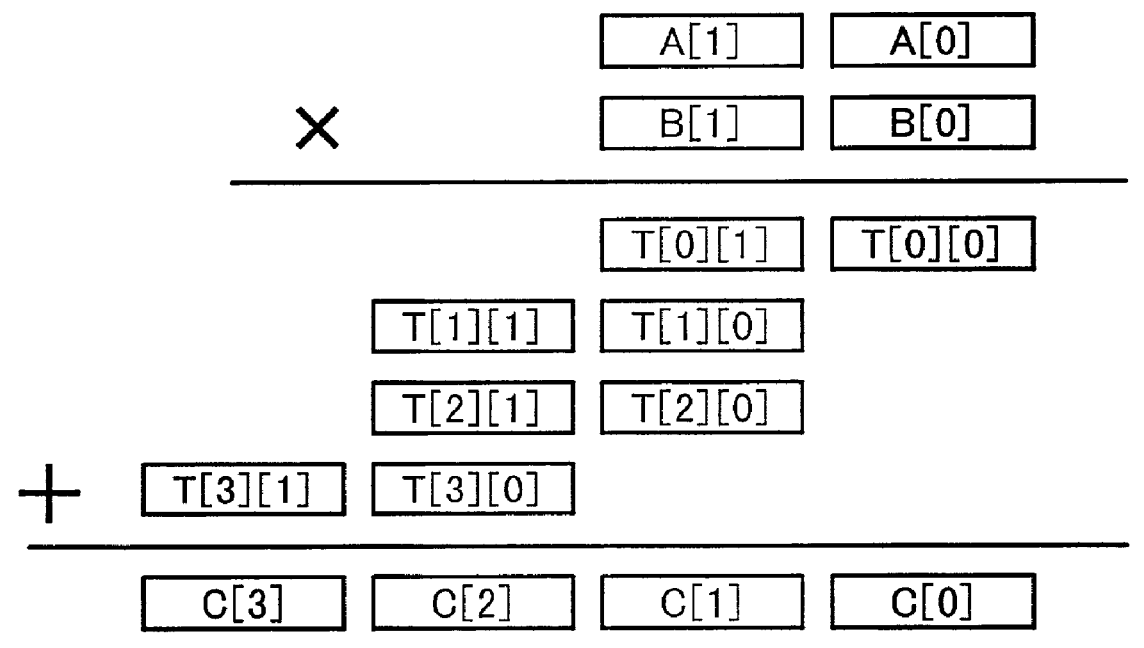

In the next embodiment, how to handle product instead of sum will be explained. In the case of product, its essence is quite the same. Suppose an instruction called MULTI. MULTI RSL, RDL means that the 8 bits on LOW side of RS is multiplied by the 8 bits on LOW side of RD and the product is stored on RD (16 bits). In FIG. 23, the processing of calculating the product of A of 16 bits and B of 16 bits with MULTI is shown. Here numbers are expressed as follows: A (A[1]A[0]), B=(B[1]B[0]), A*B=C=(C[3]C[2]C[1]C[0]) (where A[J], B[J] and C[J] are 8-bit block each). At first, the product of A[0] and B[0] is calculated with multiplication MULTI. The product becomes a number of up to 16 bits. The value is stored on the RD. We put the value to be T[0] [1], T[0] [0] from the higher order. T[0] [0] is put to C[0] as it is. Next, the product of A[1] and B[0] is calculated and the value is put to be T[1] [1], T[1] [0] from the higher order. Next, the product of B[1] and A[0] is calculated, and the value is put to be T[2] [1], T[2] [0] from the higher order. The sum of T[0] [1], T[1] [0] and T[2] [0] is calculated with the use of ADD.B (a 8 bit sum calculation with carry) two times, and the carry and C[1] are obtained. The sum of T[1] [1], T[2] [1], T[3] [0] is calculated with the use of ADD.B (a 8 bit sum calculation with carry) twice, and the carry and C[2] are obtained. The carry and T[3] [1] are added with ADD.B to obtain C[3]. In the last step no carry occurs.

Here numbers are expressed as shown below: A=(A[N−1]A[N−2] ... A[1]A[0]), B=(B[N−1]B[N−2] ... B[1]B[0]) (each of A[J] and B[J] is 8-bit block). It is assumed that there are temporary storage areas named TMP1 and TMP2 of 8*N bits each on the RAM with no duplication from each other. The explanation of the processing portion of the multi-bit sum will be left to FIG. 21 and in the following the explanation will be omitted.

Figure 24:
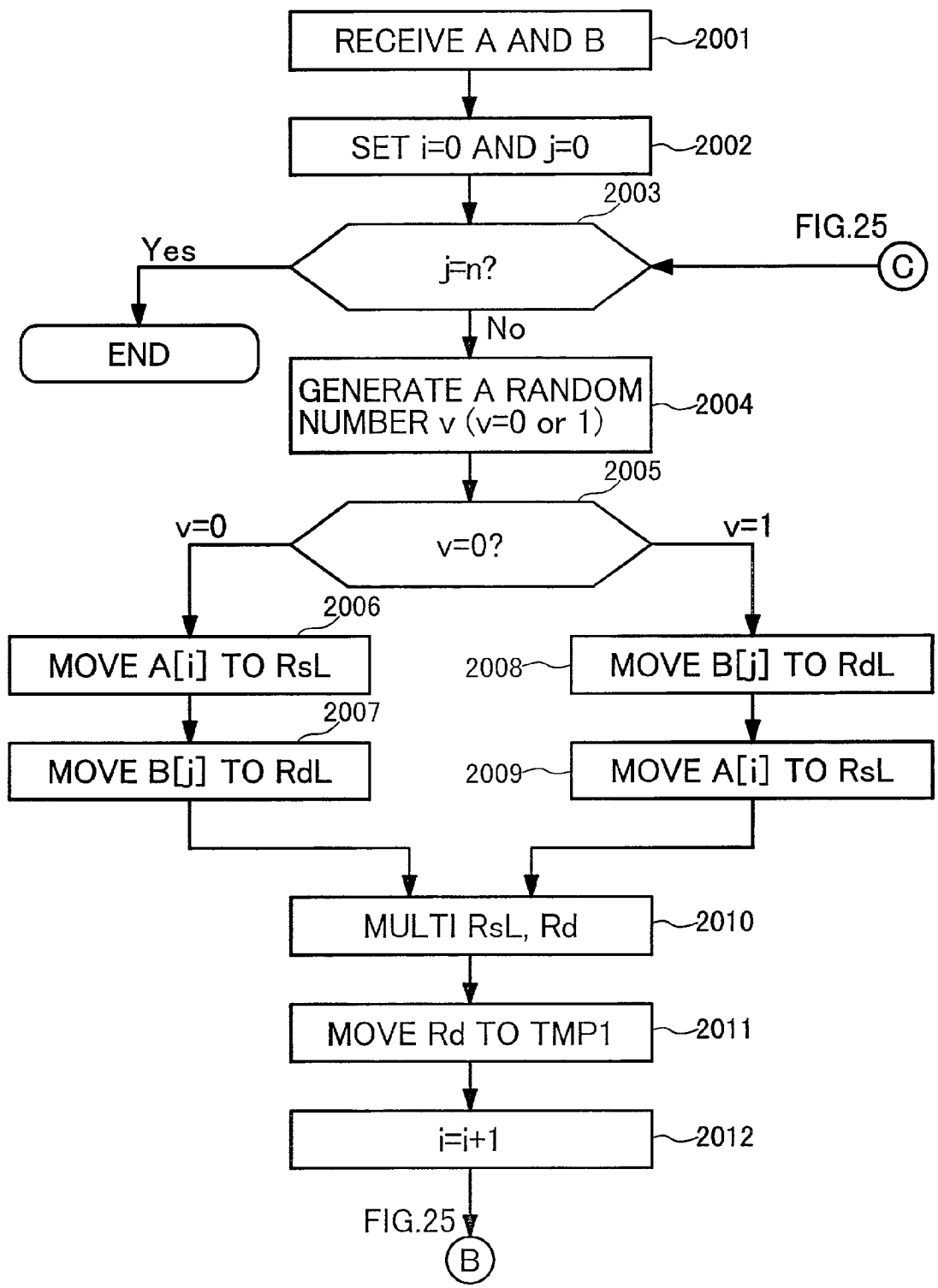
FIG. 24 is a view showing processing procedures of multiplication in an embodiment.
Figure 25:
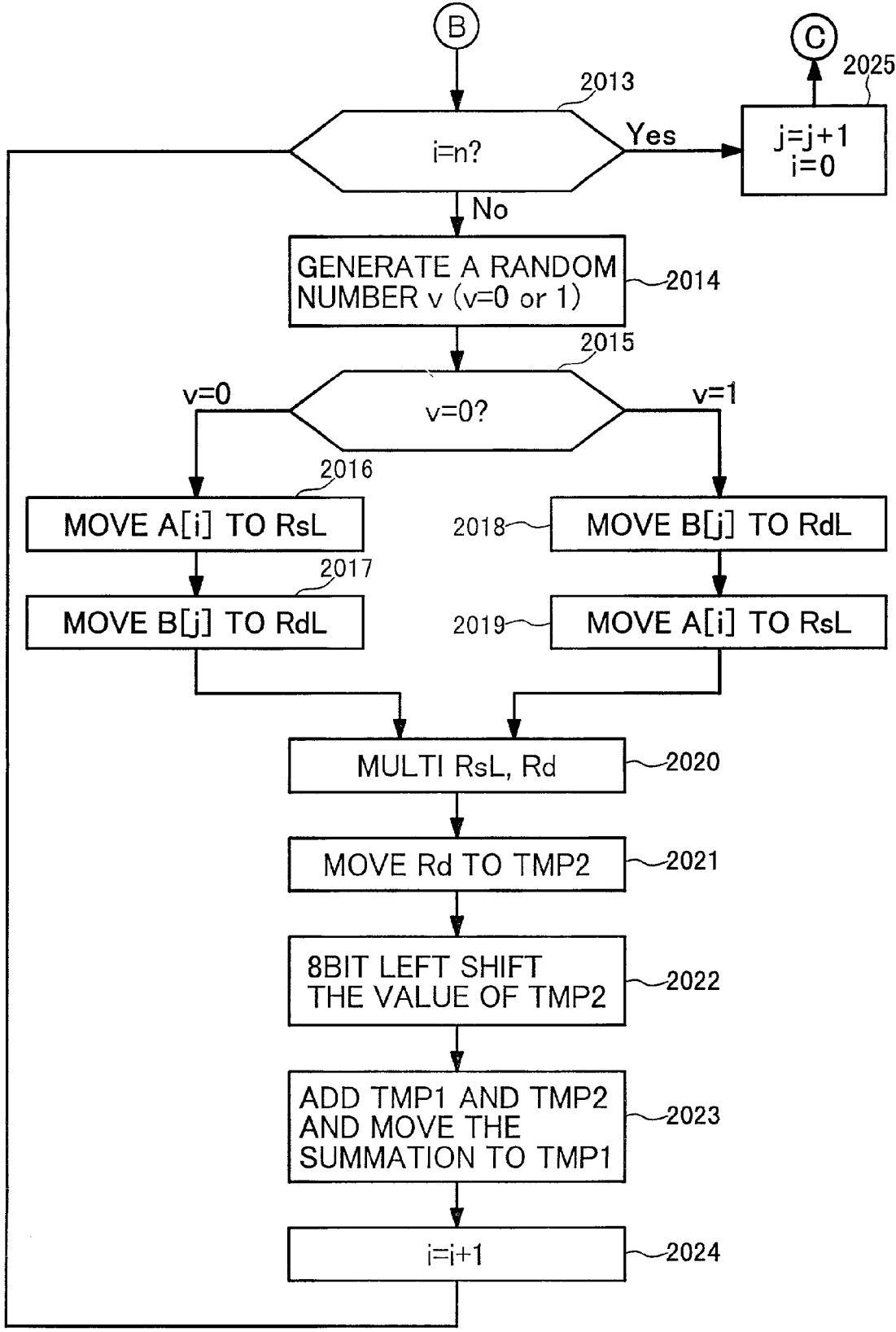
FIG. 25 is a view showing processing procedures of multiplication in the embodiment (continued from FIG. 24)

FIG. 24 and FIG. 25 show the procedures of calculating the product of A and B. At first, A and B are received (step 2001). In this place the word "receive" means not only to receive the signals through the I/O port; but also to have A and B determined as a result of other calculation. Next, the counters I and J are initialized to 0 (step 2002). The conditional branch process (step 2003) judges whether the counter J is N or not. If J=N, it means all bit blocks have been processed, so that the procedure is brought to an end. If J is not N, the procedure is advanced to step 2004. At step 2004, 1 bit random number V is generated. After that the conditional branch process (step 2005) judges if V is 0 or 1. If it is 0, A[I] is transferred to the source resister RSL (step 2006), and after that B[J] is transferred to the destination register RDL (step 2007). After that, MULTI RSL, RD is executed (step 2010), and the value of the destination register RD in which the value of the partial product is stored is transferred to the temporary storage area TMP1 on the RAM (step 2011). Next, the counter is incremented by 1 (step 2012), and the process is advanced to the conditional branch process (step 2013). The conditional branch process (step 2013) judges if the counter I is N. If I=N, the counter j is incremented by 1 and I is initialized to 0 (step (2025), and the process procedure is returned to the conditional branch (step 2003) to perform operations as described above. At the conditional branch process (step 2013), if I is not N, 1 bit random number V is generated (step 2014), then V is checked (step 2015), and if V=0, after A[I] is transferred to RSL (step 2016), B[J] is transferred to RDL (step 2017). Inversely, if V=1, after B[J] is transferred to RDL (step 2018), A[I] is transferred to RSL (step 2019). After processing of either step, step 2017 or step 2019, MVLTI RSL, RD is executed (step 2020), and RD is transferred to TMP2 (STEP 2021). Then the value of TMP2 is shifted to the left by 8 bits (step 2022), the sum of TMP1 and TMP2 is calculated (on this operation refer to the explanation in FIG. 21), and the result is transferred to TMP1 (step 2023). Then I is incremented by 1 (step 2024), and the procedure is returned to the conditional branch (step 2013).

In the above process, a random number is generated and according to the value of it, the process is switched; either first A[J] is transferred to RS and then B[J] is transferred to RD, or inversely first B[J] is transferred to RD and then A[J] is transferred to RS. With the above-mentioned switching, the waveform of the consumption current of an IC chip is varied; in particular, if one tries a process of averaging the waveforms to eliminate noises for observing the difference of data (for the typical oscilloscope, noises are eliminated by this method), the waveform is observed only as the mean value of A and B; therefore it becomes difficult to estimate the contents of each of them. Although an example, is not shown, it is easy to limit the present embodiment to the sum of a single 8-bit block. In the present embodiment, the conditional branch process is switched with a random number V, but it is easy to change it to a pseudo-random number using a linear congruence method, a chaotic sequence or a predetermined bit pattern, and the above alternatives have nothing to do with the essentials of the present invention.

Figure 26:
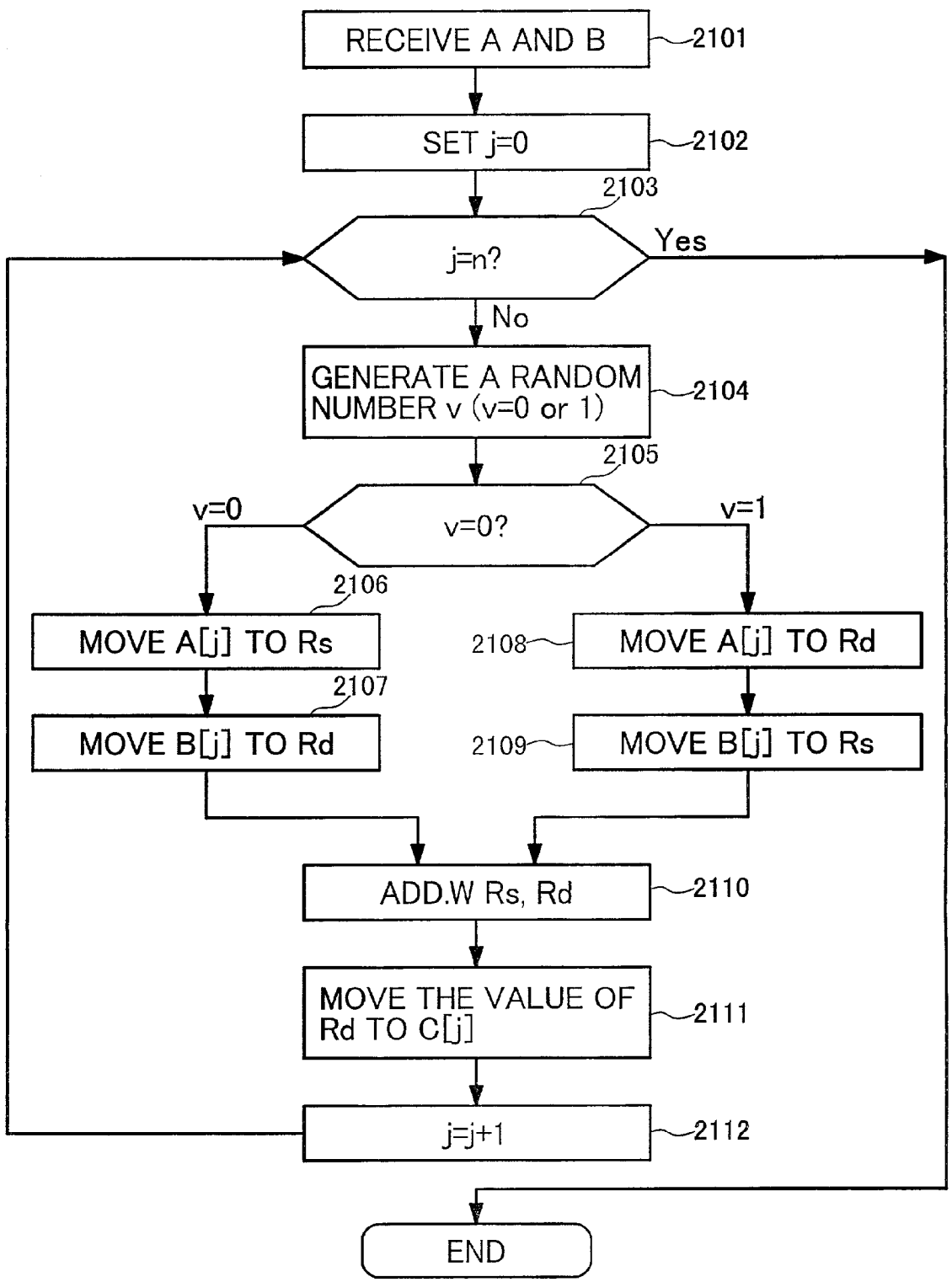
FIG. 26 is a view showing processing procedures of sum calculation in another embodiment.

In the embodiment shown in the above, the order of transferring A to the source register RS and transferring B to the destination register RD has been changed. As a similar modification to the above, the following method can be considered. Either first A is transferred to the source register RS and then B is transferred to the destination register RD, or first A is transferred to the destination register RD and then B is transferred to the source register RS, can be switched at random. The embodiment of this system will be shown with the case of addition. It is a slight modification of the above embodiment, so that the embodiments which can be easily estimated as in the case of multiplication will be omitted. Here numbers are expressed as shown below: A=(A[N−1]A[N−2] . . . A[1]A[0], B=(B[N−1]B[N−2] . . . B[1]B[0]) (A[J], B[J] is respectively 16-bit block). FIG. 26 shows the procedure for calculating the sum of A and B. At first, A and B are received (step 2101). "receive" means not only to receive the signals through the I/O port; but also to have A and B determined as a result of other calculation. Next, the counter J is initialized to 0 (step 2102). The conditional branch process judges if the counter is N. If J=N, it means that the processing of all bit blocks is over, so that the procedure is terminated. And if not, the procedure is advanced to step 2104. At step 2104, 1 bit random number V is generated. After that, at the conditional branch process (step 2105), it is judged if V is 0 or 1. If it is 0, A[J] is transferred to the source register RS (step 2106). After that, B[J] is transferred to the destination register RD (step 2107). After that, ADD.W RS, RD is executed (step 2110). At step 2110, the sum of both value of RS and the value of RD is calculated, and the result is transferred to RD. If a carry up occurs, it is held as a carry, and in the next ADD.W process the process of adding 1 is executed. Since this portion is processed by the instruction of ADD.W, nothing is written on the flow chart. A programmer of assembler language does not usually handle the process of carry. Next, the contents of RD are stored on a predetermined area C[J] of C (step 2111). Next, J is incremented (step 2112), and the procedure is returned to the conditional branch process (step 2103). Inversely, if V is 1, A[J] is transferred to the destination register RD (step 2108), and after that B[J] is transferred to the source register RS (step 2109). After that, ADD.W RS, RD is executed (step 2110). At step 2110, the sum of the value of RS and the value of RD is calculated, and the result is transferred to RD. If a carry occurs, it is held as a carry, and in the next ADD.W process, the processing of adding 1 is executed. Next, the contents of RD are stored on the RAM at the predetermined area C[J] of C, (step 2111). Next, J is incremented (step 2112), and the procedure is returned to the conditional branch process again (step 2103). By the switching of process by means of the random number, the waveform of the consumption current of an IC chip is varied, an attacker is disturbed. However with this method, only transfer registers are switched. Thus the effect of averaging cannot be expected unlike the embodiment shown in FIG. 22. In some microcomputers, there is a large difference in the consumption current between the transfer of data to RS and the transfer of data to RD, and in such a case the process shown in the present embodiment may be effective. Although not showing an example, but it is easy to limit the present embodiment to the sum of a single 16-bit block. In the present embodiment, the conditional branch process is switched with the random number v; however, it can be easily changed to pseudo-random number using a linear congruence method, a chaotic sequence, or a predetermined bit pattern, and above alternatives have nothing to do with the essentials of the present invention.

If the present embodiment and what is shown in FIG. 22 are used with a combination of them, further high scramble effect will be expected.

A further embodiment will be explained. In the above embodiments, when data is partitioned into bit blocks (for example, partitioned to 8 bit blocks or 16 bit blocks) and an arithmetic operation such as addition or multiplication is performed, a carry (in the case of subtraction: borrow) occurs; therefore it is impossible to execute independent operation of a bit block from another. On the other hand, in the case of logical operation, such as EXOR, AND, or OR, the operation is performed bit by bit. Thus there is no process for a bit block which influences another process for another bit block, such as a carry. In such a case, we are able to expect a greater scramble effect than that in the above embodiment.

Figure 27:
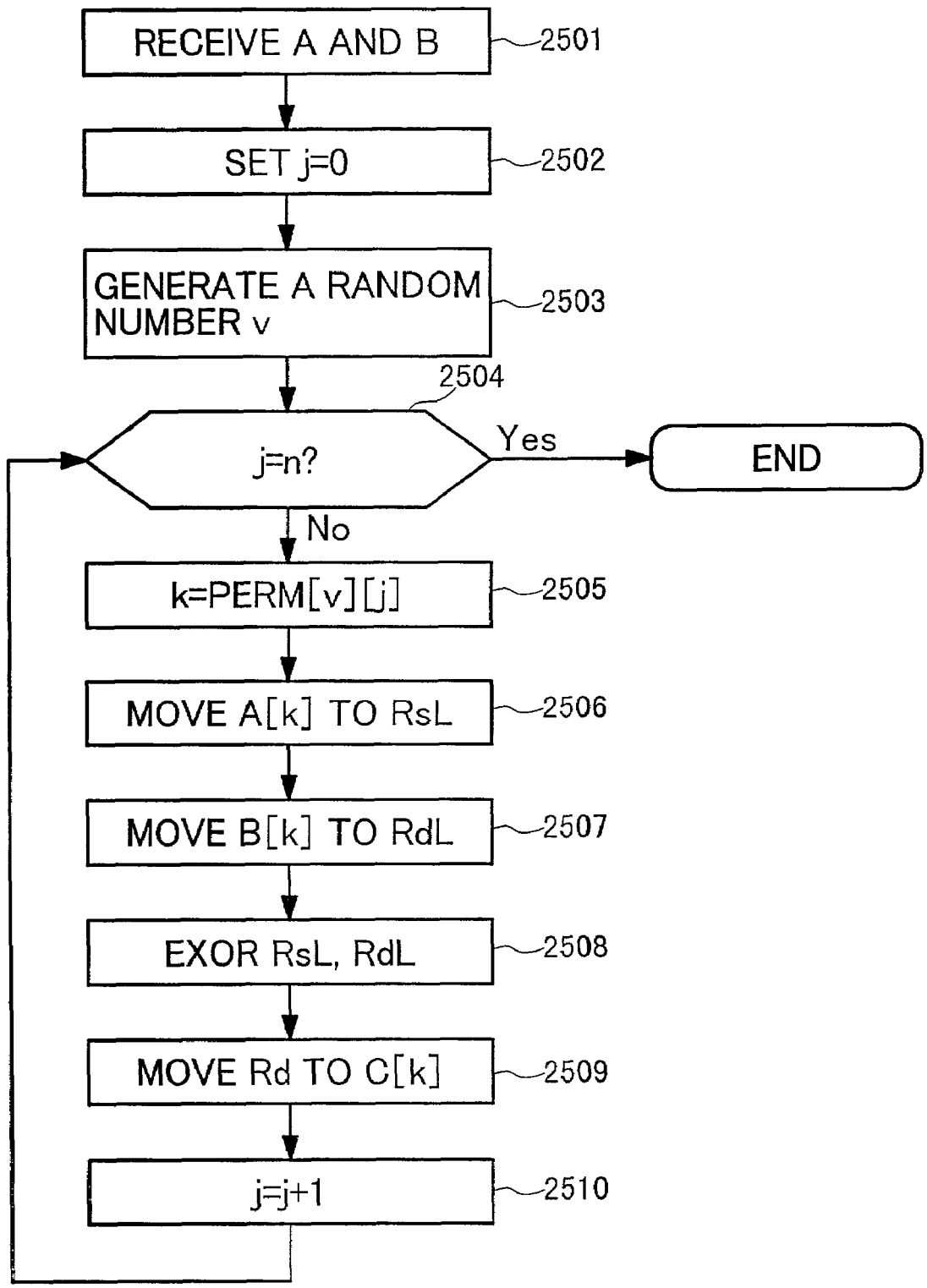
FIG. 27 is a view showing processing procedures of the exclusive OR in another embodiment.
Figure 30:
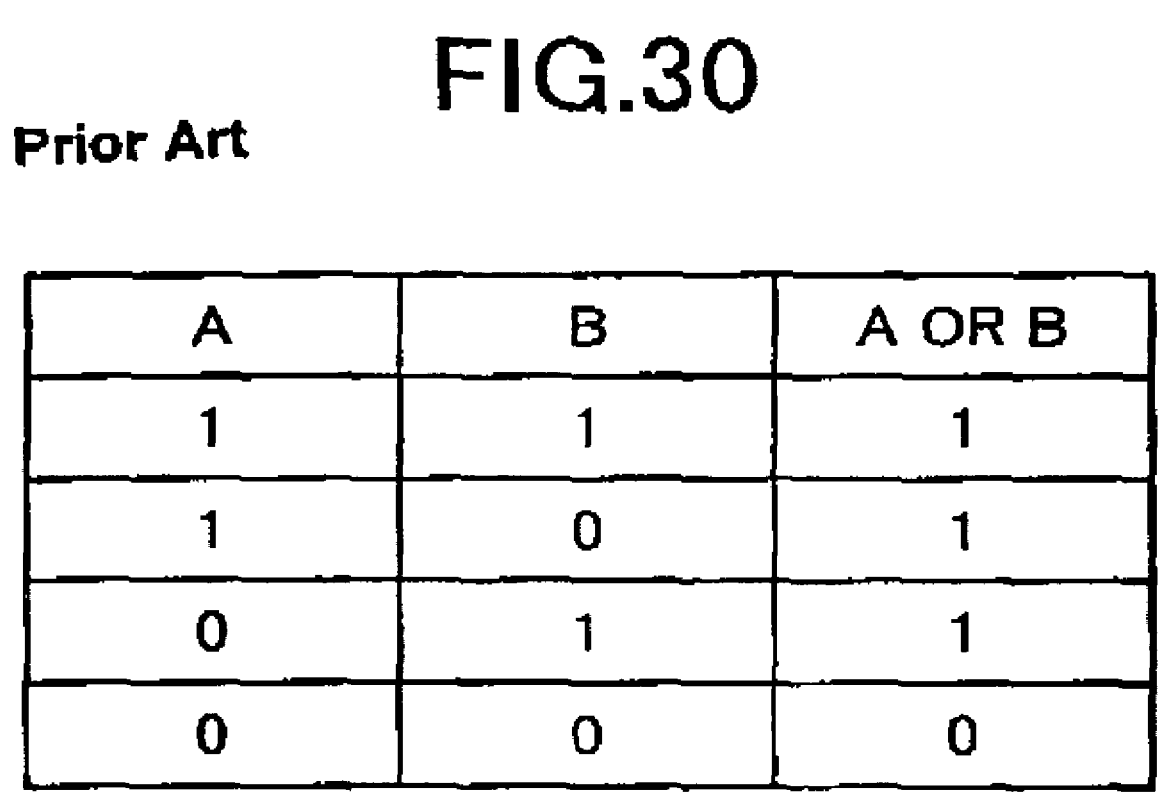

FIG. 27 shows such an embodiment applied to the calculation of A EXOR B, where numbers are expressed as follows: A=(A[N−1]A[N−2] . . . A[1]A[0]), B=(B[N−1]B[N−2] . . . B[1]B[0]) (A[J] or B[J] is 8 bit block), the present embodiment is applied to the case where A EXOR B is calculated. For AND and OR, the calculation is similar, so that the explanation will be omitted (for reference, the operation table of the logic operations, EXOR, AND and OR, are shown in FIGS. 28, 29 and 30). Here the result of operation of A EXOR B is expressed as in the following, C=(C[N−1]C[N−2] . . . C[1]C[0]). In FIG. 27, PERM[V] is a permutation determined by a probability variable V, and PERM[V][J] is the J-th component of it. (J=0, 1, . . . N−1). To be more specific, for example, when N=3, PERM[V] is one of the following 6 permutations,

PERM[0] (0 1 2)→(0 1 2)

PERM[1] (0 1 2)→(0 2 1)

PERM[2] (0 1 2)→(1 0 2)

PERM[3] (0 1 2)→(1 2 0)

PERM[4] (0 1 2)→(2 0 1)

PERM[5] (0 1 2)→(2 1 0)

To confirm this expression, an example will be cited. For example, PERM[3] [1]=2 (a first component of PERM[3]), PERM[5] [2]=0 (a second component of PERM[5]). These permutations are stored on the RAM.

In the present embodiment, the probability variable V follows uniform distribution with taking values in the range of from 0 to N!−1 (N!=N*(N−1)* . . . *2*1).

On the assumption of the above, let us enter the explanation of FIG. 27. At first, A and B are received to be used for the operation (step 2501). Next, the counter J is set to 0 (step 2502), and a random number V is generated (V is one shown above) (step 2503). Next, the procedure enters the conditional branch process (step 2504). At the conditional branch process (step 2504), it is judged if the counter J is N or not. If J=N, since it means all bit blocks have been processed, the processing is brought to an end. If J is not N, set K=PERM[V][J] (step 2505) and A[K] is transferred to RSL (step 2506), B[K] is transferred to RDL (step 2507), and EXOR RSL RDL is executed (step 2508). The value of RDL in which the result is stored is transferred to C[K] (step 2509), then the counter is incremented by 1 (2510), and the process returned to the conditional branch process (step 2504). Although not showing an example, it is easy to substitute the present embodiment with other logical operations such as AND or OR. Actually by substituting the operation at step 2508 shown in FIG. 27 with that of AND RSL, RDL or OR RSL, RDL the object is attained. In the present embodiment, the process is switched by means of a random number v, but it can be changed easily to pseudo-random number using linear congruence method, a chaotic sequence or a predetermined bit pattern, and above alternatives have nothing to do with the essentials of the present invention.

In the present embodiment, to utilize the embodiments shown in FIG. 22 and FIG. 26 for the change of order of the process in step 2506 and the process in step 2507, will help produce more improvement than to use the present invention independently.

According to the embodiments of the present invention, in the information processing device such as an IC card chip, when performing a modular exponentiation calculation using CRT, the partial calculation in modular exponentiation processing for an index is processed in an order different from the ordinary one, where the index is divided with the arithmetic relationship due to CRT. Thereby it becomes difficult to estimate the processing being executed inside or to estimate the secret keys with reference to the waveform of the current consumption. Further, since the processing order when the sum or product is calculated is changed from the original order, it becomes difficult to estimate the processing or the secret keys with reference to the waveform of the current consumption.

What is claimed is:

1. A tamper-resistant processing method comprising the steps of:
    (a) deciding whether to first transfer one operation unit in the bit pattern of data A in a memory to a first register R1 and then to transfer one operation unit in the bit pattern of data B in the memory to a second register R2, or to first transfer one operation unit in the bit pattern of said data B to said second register R2 and then to transfer one operation unit in the bit pattern in said data A to said first register R1;
    (b) transferring each operation unit to said registers R1 and R2, respectively, in accordance with the order of transfer decided in step (a);
    (c) executing a predetermined arithmetic operation on the contents of said first register R1 and the contents of said second register R2;
    (d) storing the result of said arithmetic operation in the memory,
    (e) repeating the steps from (a) through (d) until said arithmetic operation for said data A and said data B is finished.

2. A tamper-resistant processing method comprising the steps of:
    (a) deciding whether to first transfer one operation unit of data A in a memory to a first register R1 and then to transfer one operation unit of data B in the memory to a second register R2, or to first transfer said one operation unit of the data A to said second register R2 and then to transfer said one operation unit of the data B to said first register R1;
    (b) transferring each operation unit to said registers R1 and R2, respectively, in accordance with the order of transfer decided in step (a);
    (c) executing a predetermined arithmetic operation on the contents of said first register R1 and on the contents of said second register R2;
    (d) storing the result of said arithmetic operation in the memory;
    (e) repeating the steps from (a) through (d) until said arithmetic operation on said data A and said data B is finished.

3. A tamper-resistant processing method of claim 2 wherein whether to first transfer one operation unit of the data A to said first register R1 or to said second register R2 is determined with the use of a generated random number.

4. A tamper-resistant processing method of claim 2 wherein said predetermined arithmetic operation is the operation for an arithmetic sum.

5. A tamper-resistant processing method of claim 2 wherein said predetermined arithmetic operation is the operation for an arithmetic product.

6. A tamper-resistant processing method of claim 2 wherein said predetermined arithmetic operation is any one of the logical sum OR, logical product AND, and exclusive logical sum EXOR.

* * * * *